July 1, 1969 D. W. MABREY ET AL 3,453,345
HEAT HARDENABLE RESIN COMPOSITIONS CONTAINING
HYDROXYPOLYOXYALKYLENE ESTER POLYMERS AND
METAL ARTICLES COATED THEREWITH
Filed March 6, 1967
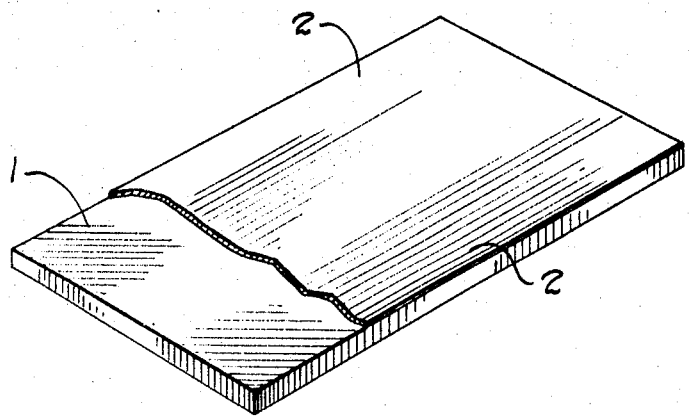
INVENTORS.
DAVID W. MABREY
IVOR PRATT
WILLIAM E. OSER
KENNETH G. HAHN United States Patent Office 3,453,345
Patented July 1, 1969

3,453,345
HEAT HARDENABLE RESIN COMPOSITIONS CONTAINING HYDROXYPOLYOXYALKYLENE ESTER POLYMERS AND METAL ARTICLES COATED THEREWITH
David W. Mabrey, Chicago, Ill., and Ivor Pratt, North Olmsted, William E. Oser, Fairview Park, and Kenneth G. Hahn, Cleveland, Ohio, assignors, by mesne assignments, to SCM Corporation, New York, N.Y., a corporation of New York
Continuation-in-part of application Ser. No. 288,004, June 14, 1963. This application Mar. 6, 1967, Ser. No. 637,031
Int. Cl. C08f 27/18, 15/40; C09d 3/80
U.S. Cl. 260—834                                22 Claims

ABSTRACT OF THE DISCLOSURE

Heat hardenable resin compositions comprising the interpolymerization reaction product of acrylamide, a lower aliphatic aldehyde, (optionally) an alcohol, a hydroxypolyoxyalkylene carboxylic acid ester of an α,β-ethylenically unsaturated carboxylic acid and at least one monomer having a $CH_2{=}C{<}$ group are described.

The invention is advantageous in that it provides coating compositions which, when applied to the surfaces of metal articles, form flexible, adherent films which are resistant to chemical attack and mechanical abrasion. The resin compositions are prepared by solution polymerization of mixtures of the above-described monomeric components and also by prepolymerizing groups of the monomeric components to form coating compositions containing two copolymers which are then interreacted.

---

This application is a continuation-in-part of United States patent application Ser. No. 288,004 filed in the United States Patent Office on June 14, 1963, and now abandoned.

The invention relates to heat hardenable resin compositions, to coating formulations containing the resin compositions, and to metal articles coated with cured films of the coating compositions. The present invention provides a heat hardenable resin composition comprising the interpolymerization reaction product of (a) From about 1.2 to about 26 weight percent of acrylamide,
(b) From about 0.75 to about 1.75 mole, per mole of said acrylamide, of a lower aliphatic aldehyde,
(c) From about 0 to about 1.75 mole, per mole of said aldehyde, of an alcohol,
(d) From about 0.6 to about 45 weight percent of a carboxylic acid ester of the formula

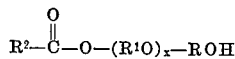

wherein $R^1$ and R can be same or different lower alkylene groups containing from 2 to 8 carbon atoms, where $x$ is an integer of from 1 to 8; and where the grouping

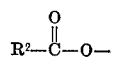

is an acyloxy group selected from the class consisting of acyloxy residues of acrylic, methacrylic and ethacrylic acids and the mono-acyloxy residues of half esters of α,β-unsaturated dicarboxylic acids,
(e) From about 0 to about 5 weight percent of an α,β-ethylenically unsaturated carboxylic acid, and
(f) From about 25 to about 95 weight percent of at least one monomer having a $CH_2{=}C{<}$ group, the sum of said percentages totaling 100 weight percent.

An embodiment of a resinous reaction product, falling within the scope of this invention is a linear interpolymer represented by the following general structure:

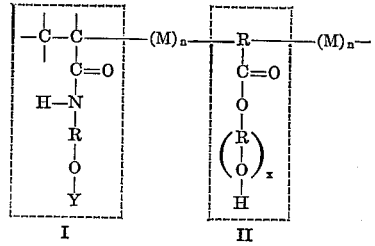

I   II where M represents a unit polymerizable with acrylamide and hydroxypolyoxyalkylene esters of α,β-ethylenically unsaturated carboxylic acids and is composed of at least one monomer, said monomer having a $CH_2{=}C{<}$ group; $n$ is an integer greater than 1; R is lower alkylene containing 1 to 4 carbon atoms; $x$ is an integer of from 1 to 8; and Y is hydrogen or lower alkyl and where the bracketed grouping (I) is an alkylol acrylamide or etherified alkylol acrylamide and wherein the bracketed grouping (II) is a hereinafter defined hydroxypolyoxyalkylene ester of an α,β-unsaturated carboxylic acid.

The linear polymer above described is composed of a "back bone" of vinylidene monomers. In the "back bone" there is incorporated the alkylol amide and hydroxy polyoxy alkylene esters of a carboxylic acid. From the foregoing it will be evident to those skilled in the art that the amount and periodicity of residues of acrylamide, alkylolamide or its ether and also the residues of hydroxypolyoxyalkylene enter in the linear chain, can be regulated by the various amounts of monomeric materials in the polymerization mixture. As will be evident from the specific examples a wide variety of linear polymers, having molecular weights ranging from 10,000 to 250,000 can be readily prepared.

The above-described linear thermoplastic polymerization reaction product, when dissolved in a suitable solvent and applied to the surface of an article, forms a coating which when heated at a temperature from about 250° F. to about 500° F. is converted to a tough resistant thermosetting resin film. The conversion occurs by virtue of a cross-linking reaction between the alkylol acrylamide residues and the hydroxy polyoxyalkylenes ester residues in the linear polymer chains.

The interpolymerization products are formed by conventional solvent free radical polymerization and are substantially linear. They are advantageous in that they form films which, upon thermal curing, have an excellent flexibility, recoat adhesion, and freedom from undesirable color formation, particularly upon overbaking of the film. For example, the coating compositions of this invention form films which are outstanding in appearance, gloss, mar-resistance, color retention, moisture resistance, stain resistance, grease resistance, heat resistance, detergent resistance, corrosion resistance, adhesion and flexibility, and which have no undesirable odor. These properties render the compositions of this invention useful as finishes for appliances such as ranges, refrigerators, air conditioners, washers, water heaters, and as general, industrial finishes on solid surfaces such as metals, plastics, wallboard, and the like.

The heat hardenable resins and coating compositions containing them can be readily prepared by conventional, free radical, solution polymerization of the above-described monomeric components. Coating compositions falling within the scope of this invention and which produce substantially the same coatings as the coatings above referred to can also be prepared by separately polymerizing hereinafter defined portions of certain of the above-described monomers to form distinct linear copolymers, one containing the vinylidene monomer or monomers; one the above-mentioned alkylol acrylamide or etherified alkylol acrylamide grouping and the other containing the vinylidene monomers and the hydroxy polyoxyalkylene grouping. Such copolymers can be blended in an organic solvent to form coating compositions which, when thermally cured, provide coatings comprising the interpolymerization reaction products hereinbefore described.

THE MONOMERS

As previously noted, acrylamide is one of the monomers employed in the interpolymerization reaction to form the resin product of this invention. Although substituted acrylamides, such as methacrylamide and ethacrylamide, may also be employed, there is no advantage and acrylamide is preferred for economic reasons.

The amount of acrylamide employed may vary considerably from about 1.2 to about 26 weight percent based on the weight of the interpolymerization reaction product and will depend, to some extent, upon the amount of carboxylic acid hydroxy ester and of vinylidene monomers (e.g. monomers having a $CH_2=C<$ group) employed. Generally speaking, the lower amounts of acrylamide will correspond to the hereinafter described higher quantities of vinylidene monomer employed. If less than about 1.2 percent acrylamide is employed, coatings made from the resins will tend to lose their curability. If more than about 26 weight percent of acrylamide is employed, the solutions of the coating (e.g. coating compositions) will tend to gel on standing and will be difficult to apply to metal articles. Compositions containing between about 2 and about 15 weight percent of acrylamide have been found to produce interpolymerization reaction products which, upon curing, are flexible and have particularly desirable resistance to heat, acids, alkalis, and the like.

As will be evident hereinafter, the acrylamide component reacts in situ with the aldehyde component during the polymerization of the monomers to form alkylol acrylamide groups in the linear polymer chain. If desired, a portion or all of the acrylamide can be converted in situ to alkylol acrylamide groups which can be partially to completely etherified (also in situ) when an alcohol is included along with the mixture of monomers prior to effectuating the polymerization reaction. The in situ formation of the acrylamide component in the linear polymer chain and the partial or complete etherification of the alkylol acrylamide groups in the linear chain will be hereinafter described and will be apparent from the specific examples.

Another monomer employed in the formation of the interpolymerization reaction product is a lower aliphatic aldehyde, preferably a lower aliphatic aldehyde containing from 1 to 4 carbon atoms in the aliphatic group. Examples of such aldehydes include formaldehyde, acetaldehyde, propionaldehyde and butyraldehyde. Of these aldehydes, formaldehyde is preferred for economic reasons.

The amount of lower aliphatic aldehyde employed may vary considerably but is preferred between about 0.75 to about 1.75 moles per mole of the acrylamide. If less than about 0.75 mole of aldehyde per mole of acrylamide is employed, the coatings formed from the resin will sometimes not be as flexible as desired. Although more than about 1.75 moles of lower aliphatic aldehyde may be employed, there is usually no advantage and there is some economic disadvantage due to the cooking off (and loss) of the excess aldehyde during polymerization.

As afore-noted, the aldehyde reacts with the acrylamide at the amide nitrogen position during polymerization to form an alkylol acrylamide corresponding to the particular lower aliphatic aldehyde employed. Although it is not known with certainty, it is believed that the alkylol acrylamide moiety aids in providing hardness and flexibility in the film.

It has often been found desirable to include an alcohol as one of the monomer components employed in the formation of the interpolymerization reaction product. When included, the alcohol reacts with the alkylol acrylamide to form an ether linkage. However, the inclusion of the alcohol is optional and will depend upon the desired end-use of the coating composition, for example, whether the coating composition is to be used to coat a surface such as that of a small appliance which will not generally be exposed to conditions of heat, acid and staining or whether the desired finish is one which will be exposed to such adverse conditions. Although a wide variety of alcohols may be employed, lower alkanols are preferred since the inclusion of these alkanols provide resin films which are particularly resistant. Alcohols which can be employed include aromatic alcohols, substituted aromatic alcohols, aliphatic alcohols, and the like. Particularly advantageous alcohols are those containing from 2 to 9 carbon atoms and include benzyl alcohol, ethanol, n-propanol, iso-propanol, n-butanol, sec-butanol, t-butanol, amyl alcohol, hexanol, etc., and the methyl, ethyl and butyl Cellosolves which are trademarks describing alkylene glycol and mono-alkyl ethers. The amount of such alcohols employed as a monomeric component will depend upon a variety of factors such as the degree of alkylol acrylamide etherification desired and the amount of aldehyde employed. Usually, the amount of such alcohol will be from about 0 to about 1.75 moles per mole of the aldehyde employed, the amount then corresponding to the degree of etherification of the alkylol acrylamide desired in the linear polymer. Particularly advantageous amounts from the standpoint of coatings which are to be exposed to rigorous environmental conditions are from about 0.9 to about 1.0 mole per mole of the aldehyde.

A critical monomeric component employed in the formation of the interpolymerization reaction product is a carboxylic acid ester of the formula

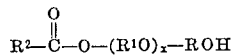

where $R^1$ and R can be the same or different lower alkylene groups containing from 2 to 8 carbon atoms, where $x$ is an integer of from 1 to 8 and wherein the grouping

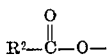

is an acyloxy group consisting of acyloxy residues of acrylic, methacrylic and ethacrylic acids and the acyloxy or the residues of full and half esters of $\alpha,\beta$-unsaturated dicarboxylic acids. Compounds falling within the scope of the above formula are sometimes hereinafter referred to for purposes of convenience and description as hydroxypolyoxyalkylene esters.

In the above formula R and $R^1$ can be ethylene, propylene, butylene, pentylene, hexylene, heptylene or octylene. However, esters in which $R^1$ and R are like and are ethylene or propylene have been found to be especially advantageous in producing resistant coatings. In the above formula, $x$ is an integer of from 1 to 8 and the various ester products falling within the scope of the formula are usually mixtures of esters containing from 1 to 8 lower alkylene oxide groups. Preferred mixtures of such hydroxypolyoxyalkylene ester mixtures are those wherein $x$ is an average of 3 to 5 since coating compositions and coatings prepared from the interpolymerization reaction products containing such esters are stable against gelation and are also weather resistant.

The grouping

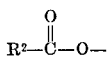

is an acyloxy group consisting of acyloxy residues of acrylic, methacrylic and ethacrylic acids and acyloxy residues of full and half esters of α,β-unsaturated dicarboxylic acids. Esters containing a particular acyloxy residue are selected according to the intended end-use. For example, where the resin is to be made into a coating which will be subjected to rigorous environmental stresses, acyloxy residues of acrylic, methacrylic or ethacrylic acid have been found to be particularly advantageous. Preferred esters falling within the scope of the above formula include hydroxypropylpolypropoxy acrylate, hydroxyethylpolyethoxy acrylate, hydroxybutylpolybutoxy acrylate, hydroxybutylpolybutoxy and the corresponding methacrylates. Other advantageous compounds falling within the scope of the above formula include hydroxyethylpolyethoxy mono-maleate, hydroxyethylpolyethoxy dimaleate, hydroxypropylpolypropoxy mono-maleate, hydroxypropylpolypropoxy dimaleate, hydroxybutylpolybutoxy mono-maleate, hydroxybutylpolybutoxy dimaleate and corresponding fumarates and itaconates. Particularly preferred compounds are hydroxyethylpolyethoxy acrylate and hydroxypropylpolypropoxy methacrylate wherein the ester products are mixtures containing an average of four alkylene oxide groups per molecule.

The amount of hydroxypolyoxyalkylene esters may vary considerably between about 0.6 to about 45 weight percent of the reaction product and will depend upon the type of coating desired. Generally, where a coating is desired to be flexible and highly resistant to a wide variety of conditions such as acids, alkali, heat, from about 2 to about 10 weight percent of esters are employed. When an interior finish (i.e., a surface coating of a small electrical appliance) is desired from about 10 to about 30 percent of such esters can be suitably employed. Generally speaking, the lower quantity of the ester will correspond to the lower quantity of the acrylamide component employed since it is the reaction between the alkylol acrylamide residue and the ester which result in curing of the polymer film and the formation of thermosetting coatings.

Where low quantities of acrylamide and esters are employed, high molecular weight linear thermoplastic reaction products are usually obtained and these products are particularly desirable in forming flexible weather resistant coatings. Generally, when smaller amounts of the above esters are used with correspondingly smaller amounts of acrylamide, linear polymers having a molecular weight between 80,000 and 150,000 are obtained. When higher amounts of the esters of acrylamide are employed, linear polymers having lower molecular weight (e.g., from about 20,000 to 80,000) will usually be obtained. Generally speaking, the coating compositions containing the higher molecular weight polymers form tough flexible resilient coatings which do not discolor or lose their surface gloss or other properties under a wide variety of environmental (e.g., heat, acid, alkali, etc.) conditions.

If less than about 0.6 percent by weight of such esters are employed, the compositions will usually not be stain-resistant and will lose a certain amount of their flexibility. Although more than about 45 weight percent of the esters may be employed, there is usually no advantage and there is some danger of the coatings losing stain-resistance and flexibility.

Another monomer component employed to form an interpolymerization reaction product falling within the scope of this invention is an α,β-ethylenically unsaturated carboxylic acid. Any of a wide variety of such acids can be employed in the compositions of this invention including, for example, α,β-ethylenically unsaturated mono-carboxylic acids and α,β-ethylenically unsaturated dicarboxylic acids. Examples of α,β-ethylenically unsaturated mono-carboxylic acids include acrylic, substituted acrylics such as methacrylic and ethacrylic, crotonic, iso-crotonic, vinylacetic, methylacrylic, tiglic, angelic, senecioic, hexenic acids, and the like. Examples of α,β-ethylenically unsaturated dicarboxylic acid include, for example, maleic, fumaric, glutaconic, citraconic, itaconic, ethidene malonic, mesaconic acids, and the like. Of these ethylenically unsaturated acids, acrylic, methacrylic and maleic are preferred for economic reasons, and also since they provide resins which form highly resistant cured films.

The amount of unsaturated carboxylic acid will depend, in part, upon other monomeric components employed, for example, upon whether the hydroxypolyoxyalkylene esters have residual acid functionality (for example, in the case of hydroxyalkylene polyoxyalkylene half esters of ethylenically unsaturated dicarboxylic acids) and upon the molecular weight of the linear polymer which it is desired to obtain. In instances where the acid functionality is provided by the ester component (e.g., the half ester α,β-ethylenically unsaturated carboxylic acid). The acid monomer may be omitted. Usually up to about 5 weight percent of acid can be employed. If more than 5 weight percent of acid is employed, coating compositions will tend to be unstable and to gel. Usually between about 1 to about 3 weight percent of acid have been found to provide coating compositions which yield cured films of excellent properties with respect to stain-resistance, mar-resistance, and the like.

The interpolymerization reaction product of the coating compositions of this invention also contain at least one monomer having a $CH_2=C<$ group. This group is sometimes herein referred to as a vinylidine group for convenience of description.

Examples of monomers containing vinylidine groups which are suitable for use in forming the interpolymerization products of this invention include, for example, vinyl aromatic hydrocarbons such as styrene, vinyl toluene, mono-methyl styrene, divinyl benzene, and the like; vinyl esters including vinyl acetate, vinyl butyrate, vinyl stearate, vinyl halides including vinyl chloride and vinyle fluoride; alkyl esters of any of the acids of the acrylic acid series represented by the formula $CHR=CR^1—COOH$ where R and $R_1$ can be the same or different and contain from 1 to 10 carbon atoms and wherein the alkyl ester groups can contain 1 to 20 carbon atoms, for example, butyl acrylate, butyl methacrylate, 2-ethylhexyl acrylate, stearyl methacrylate, ethyl angelate and lauryl acrylate; amides of any of the acids of the acrylic acid series, acrylonitrile, vinyl pyridene, 1–10 carbon dialkyl esters of maleic acid, 1–10 carbon alkyl half esters of maleic acid, vinyl ketones, vinyl ethers, dialkylol methylate, allyl aceto acetate, glycidyl acrylate, methacrylates, and the like.

In general, preferred monomers are those containing a single $CH_2=C<$ group in a terminal position and especially preferred groups of such monomers include methyl acrylate, ethyl acrylate, butyl acrylate, methyl methacrylate, styrene, vinyl toluene and mono-methylstyrene.

The amount of such vinylidine monomers employed may vary within the range of from about 25 to about 95 weight percent basis the weight of the interpolymerization reaction product. If less than about 25 percent by weight of such monomers are employed, resin films prepared from the interpolymerization reaction product will often be undesirably rigid or inflexible. On the other hand, if more than about 95 weight percent of such monomers are employed, the cured films will not have the mar-resistance which is usually desired.

As will be evident from the specific examples, the interpolymerization products can be prepared by any conventional free radical polymerization process in which a mixture of monomers and a catalyst are added to an organic solvent, with agitation, and heat. The monomer mixture, which usually includes the catalyst is added to the solvent over a period of time at a rate which is determined by a number of factors including the molecular weight of the polymer desired and reaction temperature (since the reaction is exothermic). The polymerization reaction is carried out at a temperature between about 200° and about 350° F., the higher temperatures being employed when lower molecular weight polymers are desired; the lower temperatures being employed when it is intended to manufacture higher molecular weight polymers.

The solvent is preferably heated to reflux temperatures prior to the relatively slow addition of the monomer-catalyst mixture. Ordinarily, the solvent reaction mixture is kept at reflux temperatures during the addition of the monomer mixture which usually is carried out over a period of between 1 and 16, usually 2 and 3 hours. The resultant reaction mixture is maintained at reflux temperatures for an additional period until the conversion is complete. External cooling of the polymerization mixture and/or control of reflux conditions is important in carrying out the reaction because of the rapidity of the reaction rate and because of the exotherm produced by the reaction. Good agitation during polymerization is required and the process is usually carried out under a blanket of an inert gas such as nitrogen.

The catalyst employed in carrying out the polymerization reaction is usually a per-oxygen type catalyst. Useful catalysts include acetyl benzoyl peroxide, hydroxyheptyl-peroxide, methyl ethyl ketone peroxide, cyclohexanone peroxide, cyclohexylhydroperoxide, 2,4-dichlorobenzoyl peroxide, cumene t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, per-acetic acid, di-t-butyldiparaphthalate, t-butyl per-acetate, and the like. Diazo compounds such as p-methoxyphenyl diazthio (2-naphthoyl) ether and redox catalyst systems can also be employed. Catalysts which are preferred for economic reasons include, for example, cumene hydroperoxide which can be advantageously used when the solvent has a higher reflux temperature and benzoyl hydroperoxide when the solvent has a lower reflux temperature.

Solvents which can be employed in the above-described polymerization reactions include hydrocarbons such a toluol, xylol, naphthol, and alcohols such as lower alkylene glycol alkyl ethers (e.g., the Cellosolves), butanol, propanol benzyl alcohol, etc., or mixtures thereof. Mixtures of an alcohol and a hydrocarbon are preferred in order to effect the in situ formation of etherified alkylol acrylamide. The particular solvent employed can depend upon the polymerization temperature desired.

The amount of solvent employed will depend upon the concentration of the final polymer in the solvent solution (i.e., coating composition) amounts of solvents which provide the polymer content of from 20 to 60 weight percent, based on the total weight of the solution, may be employed. Where the polymer has a high average molecular weight (e.g., 80,000 or greater) such solutions usually contain 50 percent and more of solvent. During polymerization or after the polymerization is complete, the water formed as a result of the polymerization condensation reaction is azeotropically removed from the solution. The resin solution so obtained is a coating composition which can be used as a lacquer and directly applied to the surfaces of articles or can be used as a basic vehicle in the formulation of paints or enamels, the conventional non-resinous components of which can be readily incorporated in the coating (polymer) composition. Prior to bake curing, the resin coating is thermoplastic but is converted to a tough, flexible resistant resin coating upon heating.

The following specific examples are intended to illustrate the invention but not to limit the scope thereof, parts and percentages being by weight, unless otherwise specified.

EXAMPLE 1

Polymer solutions were prepared using the solvents and monomer mixtures in the amounts listed in Table I below.

TABLE I

|  | Composition Number (wt. in grams) | | | | | |
|---|---|---|---|---|---|---|
|  | 1 | 2 | 3 | 4 | 5 | 6 |
| Ingredient A: |  |  |  |  |  |  |
| n-Butanol | 418 | 418 | 418 | 800 | 457 | 457 |
| Toluol | 550 | 550 | 550 | 800 |  |  |
| Xylol | 200 | 200 | 200 |  | 457 | 457 |
| Ingredient B: |  |  |  |  |  |  |
| Hydroxypropylpoly [1] propoxy methacrylate | 50 | 50 | 50 | 146 | 83.3 | 83.3 |
| Acrylamide | 51.3 | 51.3 | 51.3 | 89.5 | 51.3 | 51.3 |
| 40% formaldehyde dissolved in butanol | 81 | 81 | 81 | 142 | 81 | 81 |
| Acrylic acid | 20 | 20 | 20 |  | 40 | 40 |
| Methyl methacrylate | 300 | 225 | 150 | 590 | 227 | 227 |
| Ethyl acrylate |  | 577 | 577 | 873 | 449 | 449 |
| Isobutyl acrylate | 577 |  |  |  |  |  |
| Methacrylonitrile |  | 75 | 150 |  | 150 |  |
| Diacetone acrylamide |  |  |  |  |  | 150 |
| Cumene hydroperoxide | 10 | 10 | 10 | 10 | 10 | 10 |
| Properties of Polymer Coating Composition: |  |  |  |  |  |  |
| Non-volatile content | 47.5 | 42.1 | 29.2 | 49.7 | 44.1 | 50 |
| Acid number | 7.5 | 7.4 | 9.7 | 0.6 | 0.3 | 0.6 |
| Viscosity [2] | P-Q | S-T | B |  | T-U | R-S |
| Color [3] | 1 | 1 | 1 |  | 1 | 1 |

[1] 60% in xylol.
[2] Gardner-Holdt scale.
[3] Gardner scale.

The solutions were prepared by charging the solvent mixtures designated A in Table I into a conventional reactor and thereafter adding the monomer mixtures designated B to the solvent mixtures to the reactor. The reactions were carried out in a conventional polymerization reactor equipped with heat controls and mechanical agitators and a trap to azeotropically remove the water formed. The solvent mixture was first charged to the reactor and heated to reflux which varied between 228° and 248° F. depending upon the solvent mixture involved. The interior of the reactor was blanketed with nitrogen and while the temperature was maintained at reflux, monomer mixture B was charged into the reactor over a 4-hour period in each instance. After the mixture was charged into the reactor, heating was continued for an additional 5 hours to complete the conversion and to remove the water produced. The properties of the resin solutions are given in Table I just beneath the solvent and monomer mixture formulae. The above reaction conditions yielded polymer solutions in which the polymer had an average molecular weight between 80,000 and 150,000.

EXAMPLE 2

The procedure of Example 1 was repeated except that polymer compositions were prepared using the solvent and monomer mixtures listed in Table II which follows in place of the solvent and monomer mixtures employed in Example 1.

TABLE II

| | Composition Number (wt. in grams) | | | | | |
|---|---|---|---|---|---|---|
| | 7 | 8 | 9 | 10 | 11 | 12 |
| Ingredient A: | | | | | | |
| n-Butanol | 366 | 366 | 457 | 300 | 306 | 457 |
| Xylol | 527 | 527 | 457 | 305 | 527 | 457 |
| Ingredient B: | | | | | | |
| Hydroxypropylpoly-propoxy methacrylate [1] | 306 | 306 | 83.3 | 83.3 | 306 | 83.3 |
| Acrylamide | 110 | 110 | 51.3 | 51.3 | 110 | 51.3 |
| 40% formaldehyde dissolved in butanol | 175 | 175 | 81 | 81 | 175 | 81 |
| Acrylic acid | 22 | 22 | 30 | 30 | 44 | 30 |
| Methyl methacrylate | 180 | 180 | | | 46 | |
| Ethyl acrylate | 277 | 277 | 499 | | 277 | 336 |
| Methyl acrylate | | | 337 | | | |
| Butyl acrylate | | | | 600 | | |
| Methacrylonitrile | | | | 236 | | |
| Styrene | | 56 | | | 168 | |
| Cumene hydroperoxide | | | | | | 500 |
| Azo bis-iso-butyronitrile | 18.4 | 18.4 | 10 | 10 | 18.4 | 8 |
| Ingredient C: t-Butyl perbenzoate | 6.2 | 6.2 | | | 6.2 | |
| Properties of Polymer Coating Compositions: | | | | | | |
| Non-volatile content | 45.7 | 44.4 | 49.6 | 58.2 | 46.5 | 45.0 |
| Acid number | 8.4 | 9.2 | | 13.6 | 11.8 | 11.4 |
| Viscosity | B-C | G-H | Q | $Z_4$-$Z_5$ | S | X-Y |
| Color | 3 | 6 | 1 | 1 | 1 | 1 |

[1] 60% ester in xylol.

The component designated C was charged into the reactor just before the final addition of component B above. The properties of the polymer coating compositions including solids content, acid number, viscosity and color are given at the bottom of Table II.

In the compositions shown in Table II, 9 and 10 were prepared by heating and maintaining the reaction temperature at 225° F. (about 20° F. below reflux). Compositions 7, 8, 11 and 12 were held at reflux. Resin compositions 9 and 10 had average molecular weights above 100,000 whereas compositions 7, 8, 11 and 12 had average molecular weights between 70,000 and 80,000.

Where the compositions are made at reflux temperatures, the water formed by the in situ etherification of the methylol acrylamide residue is removed azeotropically during the reaction. Where the polymerizations are conducted below reflux, water is usually incompletely removed, and after complete conversion of the monomers to polymerization reaction products, the resultant solution is heated to reflux to remove the water.

EXAMPLE 3

The procedure of Example 1 was repeated except that polymer compositions were prepared using the solvent and monomer mixtures listed in Table III below.

TABLE III

| | Composition Number (wt. in grams) | | | | | |
|---|---|---|---|---|---|---|
| | 13 | 14 | 15 | 16 | 17 | 18 |
| Ingredient A: | | | | | | |
| n-Butanol | 709 | 768 | 789 | 768 | 258 | 442 |
| Naphtha | 840 | 840 | 840 | 840 | | |
| Toluol | | | | | 258 | 442 |
| Ingredient B: | | | | | | |
| Hydroxypropylpoly-propoxy methacrylate [1] | 87.5 | 87.5 | 87.5 | 87.5 | 250 | 167 |
| Acrylamide | 89.6 | 114 | 89.6 | 114 | 41.5 | 51.3 |
| 40% formaldehyde dissolved in butanol | 142 | 180 | 142 | 180 | 65.7 | 81 |
| Acrylic acid | 35 | 35 | 35 | 35 | 30 | 30 |
| Methyl methacrylate | 52.5 | 500 | 350 | 326 | 268 | 312 |
| Ethyl acrylate | 1,010 | 1,010 | 1,184 | 1,184 | 474 | 474 |
| Cumene hydroperoxide | 17.5 | 17.5 | 17.5 | 17.5 | | 10 |
| Azo-bis-iso-butyronitrile | | | | | 10 | |
| Properties of Polymer Coating Compositions: | | | | | | |
| Non-volatile content | 49.9 | 50.6 | 49.8 | 51.3 | 58.8 | 49.8 |
| Acid Number | 7.3 | 8.0 | 7.5 | 7.8 | 15.0 | 11.8 |
| Viscosity | Z | Y | W | V-W | X | $Z_3$ |
| Color | | | | | | 1 |

[1] 60 percent ester in xylol.

In the compositions shown in Table III, compositions 13 through 16 were prepared at temperatures below 30° F. reflux to obtain polymers having a molecular weight above 100,000 whereas compositions 17 and 18 were prepared at reflux temperatures.

EXAMPLE 4

The procedure of Example 1 was repeated except that the solvent and monomer mixtures in the amounts listed in Table IV were employed instead of the solvent and monomer mixtures employed in Example 1.

TABLE IV

| | Composition Number (wt. in grams) | | | | | |
|---|---|---|---|---|---|---|
| | 19 | 20 | 21 | 22 | 23 | 24 |
| Ingredient A: | | | | | | |
| Xylol | 1,030 | 447 | 570 | 242 | 292 | |
| Toluol | | | | 645 | 645 | |
| Ethylene glycol monoethyl ether | | | | | | 800 |
| Do | | | | | 753 | |
| Butanol | 685 | 520 | 570 | 753 | | |
| Naphtha | | 125 | | | | 800 |
| Ingredient B: | | | | | | |
| Hydroxy propylpoly-propoxy methacrylate [1] | 125 | 104 | 104 | 146 | 146 | 146 |
| Acrylamide | 77 | 64.1 | 64.1 | 35 | 35 | 89.5 |
| 40% formaldehyde dissolved in butanol | 121 | 101 | 101 | 55.3 | 55.3 | 142 |
| Acrylic acid | 45 | 37.5 | 37.5 | 35 | 35 | 52.5 |
| Methyl methacrylate | 825 | | | 722 | 722 | 590 |
| Ethyl acrylate | 428 | 545 | | 722 | 722 | 873 |
| 2-ethylhexyl acrylate | | | 250 | | | |
| Methacrylonitrile | | | | 131 | 131 | |
| Styrene | | 500 | 795 | | | |
| Cumene hydroperoxide | 15 | | | 21.9 | 21.9 | 17.5 |
| 2,5-dimethyl hexane 2,5-dihydroperoxide | | 12.5 | | | | |
| 2,5-dimethyl hexane 2,5-diperbenzoate | | | 12.5 | | | |
| Properties of Polymer Coating Compositions: | | | | | | |
| Non-volatile content | 48.9 | 49.6 | 46.5 | 41.4 | 48.1 | 49.0 |
| Acid Number | 15.7 | 8.2 | 9.0 | 6.8 | 7.5 | 11.8 |
| Viscosity | Z-5 | W-X | W-X | | Z | W-X |

[1] 60% ester in xylol.

In the foregoing examples, hydroxypropylpolypropoxy acrylate, mono-hydroxypropylpolypropoxy maleate, dihydroxypropylpolypropoxy acrylate and the corresponding hydroethylpolyethoxy derivatives can be employed in place of the hydroxypropylpolypropoxy methacrylate employed in these examples.

Also, as will be hereinafter evident from the discussion involving the specific copolymer embodiment of this invention, an alkylolacrylamide or an etherified alkylolacrylamide can be employed in place of the acrylamide employed in the foregoing examples. Such alkylolacrylamides include methylol, ethylol, and propoylol acrylamides and the ethyl, propoyl or butyl ethers thereof.

From the foregoing specific examples, it will be evident that the alcohol in the solvent component has several functions. It serves as a monomer in the etherification of the alkylolacrylamide residue in the polymer chain, it provides excess hydroxyl functionality thus tending to prevent premature cross-linking, and also serves as part of the bulk of the solvent containing the polymer.

In the foregoing examples, acetaldehyde, propionaldehyde and butyraldehyde can be used in solution to replace the formaldehyde employed in those examples without significant change in the properties of the resin films subsequently formed.

In Examples 1 through 4, methacrylamide, ethacrylamide and their corresponding alkylolacrylamides including methylol, ethylol, propylol and butylol acrylamides can be employed. When such components are used, the aldehyde will usually be omitted.

As will be hereinafter evident from the later discussion of one specific embodiment of this invention, the coating compositions can be extended, filled and/or pigmented with any of the conventional pigments, fillers and extenders when due consideration is given for the particular acid value of the resin in the coating composition.

Further, in certain applications, conventional fritted materials can be incorporated in the coating compositions to form, after heating and curing, glazed coatings and surfaces.

The coating films prepared from the coating resins, whether they contain fillers, extenders, pigments or frits, provide cuff, resilient films which are abrasion resistant and resistant to acids, alkali and high and low temperature differentials.

Another embodiment of the present invention relates to improved coating compositions of the heat-reactive, thermosetting kind adapted for forming protective baked coatings on metallic or other heat-resistant substrates, and relates to the resulting coated metal articles. In brief synopsis, the coating compositions involve two components falling within the scope of the compositions hereinbefore described; namely, (A) thermoplastic polymer(s) prepared from alkylol acrylamide(s) (or like polymerizable amides) with other polymerizable ethylenically-unsaturated monomers, preferably other monomer(s) of an acid and/or neutral character having a $CH_2=C<$ group, and (B) thermoplastic polymers prepared from hydroxypolyoxyalkylene esters of $\alpha,\beta$ unsaturated acids with other ethylenically-unsaturated monomer(s), preferably other monomer(s) of an acid and/or neutral character having a $CH_2=C<$ group. These two components are blended together in compatible organic solvent(s) to form a homogeneous, single-phase coating vehicle. This vehicle can be further modified with other reactive cross-linking and/or film-forming material(s) and/or with pigments, fillers, extenders, etc. The thermosetting of wet applied films of the vehicles is accomplished by baking said films, thereby activating cross-linking reactions involving the —OH groups of the alkylol acrylamides, the —OH groups of the hydroxypolyoxyalkylene esters, and other active hydrogen groups such as occur in carboxyl groups provided in either of the essential polymers and/or such as occur in film-forming materials added to said vehicles as modifiers thereof.

The coating compositions briefly described above have been found to yield thermoset coatings having excellent flexibility, adhesion and protectiveness in respect to heat-resistant substrates.

Thermoplastic polymeric products comprising residues of alkylol acrylamides have been used in the prior art as film-forming components of coating compositions. Likewise, thermoplastic polymeric products comprising residues of hydroxypolyoxyalkylene esters of certain $\alpha,\beta$ unsaturated acids have been used heretofore in coating compositions. This embodiment stems from the use of both of such polymeric components in a single coating composition to secure a system which can be cross-linked under commonly-used baking conditions to secure flexible, adherent and protective thermoset films.

The alkylol acrylamide component

This component is a carbon-carbon copolymer product which can be made from a variety of different starting monomers and which, with or without appropriate intermediate operations, ends up as a product which is essentially free of ethylenic unsaturation and contains in its molecular structure residues of alkylated and/or non-alkylated alkylolacrylamides. Thus, in the above heading and elsewhere in this specification, the term "alkylol acrylamide" is used in a generic sense to identify either or both the alkylated and non-alkylated alkylol acrylamides or like derivatives of other polymerizable amides, unless otherwise indicated. Furthermore, for clarity, alkylol acrylamides are aldehyde-modified polymerizable amide products, as will be illustrated below.

One method for preparing alkylol acrylamide components of the invention is described now. A second method is described hereinafter. According to the first method, acrylamide or other polymerizable amide is polymerized with one or more ethylenically unsaturated monomeric compounds, and the resulting interpolymer reacted with an aldehyde to form one resinous component of the coating compositions of this invention. The exact mechanism whereby the amide interpolymers are obtained is not definitely known, but is believed to begin by the formation initially of a relatively short chain soluble interpolymer having an approximate structure as follows, acrylamide being utilized for illustrative purposes:

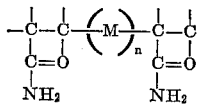

wherein M represents a unit of a monomer polymerizable with acrylamide and $n$ represents a whole number greater than 1. For example, if styrene is utilized as the second monomer, M represents the unit

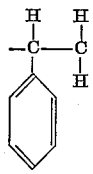

the short chain interpolymer then reacts with an aldehyde, as represented below by formaldehyde, to give the structure:

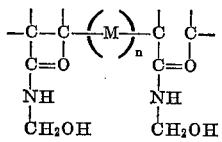

wherein M and $n$ have the significance set forth hereinabove.

In the event the formaldehyde is utilized in the form of a solution in butanol or other alkanol, etherification may take place so that at least some of the methylol groups in the above structure will be converted to groups of the structure

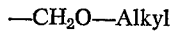

—CH₂O—Alkyl the alkyl groups being derived from the alkanol utilized. The amount of etherification taking place depends in large measure upon the pH of the reaction medium, with acid conditions favoring etherification. The etherification of the acrylamide interpolymer is believed analogous to the conventional butylation of urea and melamine resins.

It has been found that preferred acrylamide interpolymers are obtained when at least two monomeric compounds are interpolymerized with the acrylamide. In this manner it is possible to tailor the interpolymer to have any desired degree of hardness or flexibility. For example, one useful ternary interpolymer is prepared from acrylamide, ethyl acrylate, and styrene. Also a small amount of methyl methacrylate tends to improve the hardness of two component interpolymers, where one of the monomers is of the type which forms soft homopolymers, and a small quantity of an acid monomer such as acrylic acid, methacrylic acid, crotonic acid, maleic acid, or fumaric acid has been found to be particularly useful as an internal catalyst in that it imparts to the coating composition desirable fast curing properties, and obviates, at least on large measure, the need for an external curing catalyst. In place of acrylamide, any other polymerizable amide, for example, methacrylamide or itaconic diamide, can be utilized.

Interpolymers of acrylamide with one or more polymerizable monomers are most readily prepared by carrying out the polymerization in a solvent in which the acrylamide (a white, crystalline solid at room temperature) and the other monomers are soluble, and at reflux temperatures. Butanol has proved to be a satisfactory solvent in most cases. Isopropyl alcohol, butyl Cellosolve, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent converison, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercapton, and the like, are conventionally used for this purpose. However, other chain modifying agents or "short-stopping" agents such as cyclopentadiene, allyl acetate, allyl carbamate, alpha-methyl styrene, alpha-methyl styrene dimers, and the like, can be used to secure low molecular weights, as can unsaturated fatty acids or esters.

The polymerizable is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about one to 16 hours. As indicated hereinabove, it may in some instances be desirable to add only a portion of the catalyst initially, the remainder being added in increments as the polymerization progresses. External cooling of the polymerization mixture or very accurate control of reflux conditions are important in carrying out the polymerization because of the very rapid reaction rate and because the reaction is obtained by adding the acrylamide to the polymerization mixture incrementally. Good agitation is also desirable.

Another method for preparing acrylamide interpolymers involves utilization of "block" and "graft" techniques. Conventional polymerization procedures such as that described in the foregoing paragraph ordinarily result in a random distribution of the components in the interpolymers. By "block" or "graft" methods, the component can be introduced into the composition in regular sequence or order, each segment being of a certain length and periodicity. These products can be made such that the acrylamide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare by choice, materials of different solubility, solvent and flame resistance, adhesion, water solubility, and, in fact, almost any desired property can be "tailored" into the interpolymer.

Useful components are obtained by reacting the interpolymers prepared according to the method described above with an aldehyde. Formaldehyde, in solution in water (formalin) or in a lower alcohol such as butanol, or a formaldehyde-yielding substance such as paraformaldehyde, trioxymethylene, or hexamethyltetraamine, is greatly preferred. However, other aldehydes including acetaldehyde, butyaldehyde, and the like, preferably containing only atoms of carbon, hydrogen, and oxygen, can be used.

It is preferred that the aldehyde be reacted with an interpolymer containing from about 5 percent to about 45 percent by weight of acrylamide, the balance being the other ethylenically unsaturated monomers(s). It has been found that those interpolymers containing the higher levels of acrylamide with those monomers which ordinarily form hard homopolymers, give hard and flexible films, whereas interpolymers containing lower levels of acrylamide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymer. For example, in some ternary interpolymer systems it may be desirable to utilize about 20 percent by weight of acrylamide, and 40 percent each of two additional monomers such as styrene and butadiene, or in some instances, such as when acrylic acid or some other ethylenically unsaturated acid is utilized as an internal catalyst, it is desirable that the interpolymer contain about 20 percent acrylamide, a total of about 72 percent to 79 percent of two additional ethylenically unsaturated monomers and about 1.0 percent to about 8.0 percent of the unsaturated acid. The amount of monomers necessary in any interpolymerization reaction can readily be determined by simple experiment.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymers.

The reaction is preferably carried out in the presence of a mild catalyst such as maleic anhydride. Other acid catalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylenetetraamine, and other basic amines may also be utilized, and, in fact, there is evidence to indicate that the use of the basic catalysts tends to give faster curing resin films.

If desired, the catalyst may be dispensed with entirely, although it is difficult to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. If the aldehyde is not used in the form of an alcoholic solution, it is preferred, although not absolutely necessary to utilize from about 0.2 percent to 1.0 percent by weight of catalyst, based upon the weight of the acrylamide interpolymer which is reacted with the aldehyde.

The reaction of the acrylamide interpolymer with the aldehyde can be carried out simply by adding the aldehyde and the catalyst (if one is utilized) to the polymerization mixture obtained by polymerizing acrylamide and one or more ethylenically unsaturated monomers and refluxing the resulting mixture for a period of from about 3 to 5 hours until a desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric-materials may also be obtained by first reacting the acrylamide with an aldehyde such as formaldehyde to obtain an alkylol acrylamide, for example, methylol acrylamide, and then polymerizing the methylol acrylamide with one or more of the ethylenically unsaturated monomeric materials disclosed hereinabove. The polymerization utilizing methylol acrylamide is carried out in substantially the same manner as when acrylamide is interpolymerized with one or more monomers.

Regardless of the method by which the resinous material is obtained, the products will contain in the polymer chain recurrent

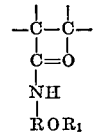

groups, wherein R is a lower aliphatic hydrocarbon radical, that is, the radical derived by removing oxygen from a lower aliphatic aldehyde; for example, if formaldehyde is utilized the radical R represents a methylene group, (—$CH_2$—). When an alcoholic solution of the aldehyde, for example, a butanol solution of formaldehyde is employed, etherification may take place and at least a portion of the alcohol is reacted into the polymer chain so that at least some of the radicals $R_1$ will represent a lower alkyl radical such as butyl, or in other words, a mixture of hydrogen and butyl radicals. When the aldehyde is utilized alone, that is, not in an alcohol solution, the radical $R_1$, of course, will represent hydrogen. The free valences may be satisfied with either hydrogen or hydrocarbon, depending on the amide which is utilized.

The starting monomers which can be copolymerized with acrylamides or alkylol acrylamides by reason of the presence of a $CH_2$=C< group or of other active ethylenic unsaturation can be selected, from the following illustrative and nonlimiting types of acidic or neutral monomers:

Vinyl hydrocarbons, such as styrene, vinyl toluene, monomethyl styrene, divinyl benzene, etc.

Vinyl esters, e.g. vinyl acetate, vinyl stearate.

Alkyl esters of any of the acids of the acrylic acid series represented by the formula CHR=CR¹—COOH where R and R¹ can be the same or different and are selected from the group consisting of hydrogen and $C_1$-$C_{10}$ alkyl groups, wherein the alkyl ester groups contain 1–20 carbons, e.g. butyl acrylate, 2-ethyl hexyl acrylate, stearyl methacrylate, ethyl angelate, and lauryl acrylate.

Amides of any of the acids of the acrylic acid series.

Any of the acids of the acrylic acid series, and/or any $\alpha,\beta$ unsaturated $\alpha,\beta$ dicarboxylic acid(s).

Acrylonitrile, vinyl pyridine, 1–10 carbon dialkyl esters of maleic acid or anhydride, 1–10 carbon alkyl half-esters of maleic acid or anhydride, vinyl ketones, vinyl ethers, diallyl phthalate, allyl acetoacetate glycidyl acrylate and/or methacrylate, durenediol dimethacrylate, pentamethyl disiloxane methyl methacrylate and the like. In general it is preferred that the monomer(s) utilized contain a single $CH_2=C<$ group in terminal position, and an especially preferred group of monomers includes methyl acrylate, ethyl acrylate, butyl acrylate, methacrylic acid, styrene, vinyl toluene, monomethyl styrene and acrylic acid.

The alkylol acrylamide component can be formulated in accordance with the following indications of relative amounts, based on the total weight of starting monomers.

| | Ranges | |
|---|---|---|
| | Broad | Preferred |
| Alkylol acrylamide or equivalent N-alkylol-yielding compound, alkylated or not alkylated. | 8% to 45% | 8% to 30%. |
| Acidic monomers | 1% to 8% | 1% to 5%. |
| Neutral and/or other monomers exclusive of foregoing. | Balance | Balance. |

As will be understood from the foregoing description, the aim here is to secure a polymeric alkylol acrylamide component having the desired relative ratios therein of alkylol acrylamide residues to other monomer residues, and having the form of a homogeneous single-phase solution in any compatible inert and volatile organic solvent(s).

The following examples illustrate the principles involved in preparing alkylol acrylamide components of the invention, and include the best modes presently known to us for practicing those principles.

EXAMPLE 5

The following kinds and amounts of monomers and other materials are used to prepare a copolymer containing residues of alkylol acrylamides:

| | Lbs. | Monomers, percent |
|---|---|---|
| Ingredient A: | | |
| Ethyl acrylate | 1,566.0 | 43.54 |
| Styrene | 1,409.4 | 39.27 |
| Acrylamide | 559.3 | 15.58 |
| Methacrylic acid | 57.9 | 1.61 |
| | | 100.00 |
| Cumene hydroperoxide | 35.8 | |
| Dodecyl mercaptan | 35.8 | |
| Methanol | 62.6 | |
| n-Butanol | 998.0 | |
| n-Butanol (stripped off later) | 2,035.8 | |
| Ingredient B: | | |
| Cumene hydroperoxide | 7.2 | |
| Methanol | 7.2 | |
| Ingredient C: | | |
| n-Butyl formcel | 1,432.9 | |
| Methanol | 104.4 | |
| Ingredient D: Xylol | 1,806.1 | |

Charge A, heat and hold for 5 hours at 230–235° F. Use good agitation throughout. Charge B and hold about 2 hours at 230–235° F. to a Gardner-Holdt viscosity of W–X in the reactor. Then cool to 210° F. and add C. Hold at 205°–210° F. for 2 hours, then strip off 2202.8 lbs. of mixed solvents using vacuum at 180° F. Finally add D.

The final product is a solvent solution having a non-volatile content of 49–51%, a Gardner-Holdt viscosity of Y–Z, at 77° F. and weighing about 7.9±.01 lbs. per gallon.

Its ultimate analysis, based on starting monomers and on the methylol acrylamide secured in the course of its preparation is approximately as follows:

| | Percent (wt.) |
|---|---|
| Methylol acrylamide | 20.80 |
| Styrene | 36.78 |
| Methacrylic acid | 1.52 |
| Ethyl acrylate | 40.90 |
| | 100.00 |

EXAMPLES 6–11

The following table illustrates various ultimate analysis (on same bases as set forth above for Example 5) of copolymer products prepared in the manner described in claim 11 except for the indicated variations in kinds and/or amounts of starting monomers, in weight percent.

| Example: | Methylol acrylamide | Styrene | Ethyl acrylate | Methyl methacrylate |
|---|---|---|---|---|
| 6 | 13.06 | 37.70 | 41.50 | 7.74 |
| 7 | 20.00 | 28.20 | 23.60 | 28.20 |
| 8 | 13.65 | 33.60 | 28.65 | 24.10 |
| 9 | 8.33 | 28.0 | 24.60 | 39.00 |
| 10 | 13.40 | 32.20 | 29.60 | 24.80 |
| 11 | 30.00 | 35.00 | 35.00 | |

EXAMPLE 12

An alkylolacrylamide component is prepared from the following kinds and amounts of materials:

| | G. |
|---|---|
| A. Butanol | 300 |
| B. Methanol | 76 |
| C. n-Butyl formcel (84 g. $CH_2O$) | 208 |
| D. Methyl methacrylate | 250 |
| E. Acrylamide | 100 |
| F. Styrene | 350 |
| G. Ethyl acrylate | 312 |
| H. Dodecyl mercaptan | 10 |
| I. Benzoyl peroxide | 10 |
| J. Xylol | 500 |

A and B are charged to a reaction kettle. C and E are charged to a mixing vessel and are there mixed together until a clear solution results. Then D, F and G are added, followed by H and I, thereby to form a homogeneous monomer/catalyst mixture.

A and B in the reaction kettle are heated to about 200° F. after which the monomer/catalyst mixture is added gradually over a period of about 20 minutes. Heating is applied when necessary to have a temperature of about 200° F. after all the monomer/catalyst mixture is in the kettle. Heating at said temperature is then continued for a total processing time of about 12 hours for conversion of the monomers and removal of the water of reaction (during etherification) to obtain compatibility of the contents with the selected hydroxypolyoxyalkylene ester copolymer. The solids content of the finished solution is 50.0 percent; viscosity Y+; 8.00 lbs. per gal.

The ultimate analysis of the resulting copolymer (on the same basis as set forth for Example 5–11) is as follows:

| | Percent (wt.) |
|---|---|
| Methylol acrylamide | 13.6 |
| Styrene | 33.1 |
| Ethyl acrylate | 29.6 |
| Methyl methacrylate | 23.7 |
| | 100.0 |

The hydroxypolyoxyalkylene ester component

This component of the invention consists essentially of acidic and/or neutral copolymer products prepared from (and therefore containing residues of) hydroxyalkyl ether esters of ethylenically-unsaturated carboxylic acids.

The hydroxypolyoxyalkylene (hydroxyalkyl ether) radicals of said esters are derived from alkylene oxide(s) and/or substituted alkylene oxides of 2–8 carbons (e.g. ethylene oxide, propylene oxide, butylene oxide, styrene oxide, etc., and mixtures thereof) and can be provided in two different ways; namely:

(1) By condensing more than one mol of selected alkylene oxide(s) with one equivalent of selected $\alpha,\beta$ unsaturated acid(s), whereby monomeric hydroxyalkyl ether esters are formed (in preference to hydroxyalkyl esters) for subsequent polymerization with selected copolymerizable monomers;

(2) By preparing acidic copolymers through copolymerization of selected $\alpha,\beta$ unsaturated, copolymerizable mono- and dicarboxylic acid(s) with other monomeric material(s), preferably containing a $CH_2=C<$ group, and then condensing selected alkylene oxide(s) with some or all of the carboxyl groups in the copolymers, such that the molar ratio of combined alkylene oxide(s) to esterified carboxyls is above one to one, whereby hydroxypolyoxyalkylene esters of the participating carboxyls are formed.

Thus, our desired copolymers which contain reactive hydroxyalkyl ether groups can be prepared:

(a) By first preparing the hydroxyalkyl-terminated monomeric ether esters and/or half esters and subsequently copolymerizing them with selected acidic and/or neutral (non-acidic) materials containing ethylenic unsaturation, preferably a $CH_2=C<$ group, or (b) By first preparing a desired copolymer containing selected carboxylic acid(s) and then hydroxypolyoxyalkylating said copolymers to secure the desired hydroxyalkyl ether groups (with or without residual unesterified carboxyl groups).

Accordingly, the copolymers to which this component of the invention pertains can be neutral copolymers in the sense that no unesterified carboxyl groups remain, or they can be acidic in that only a portion of the available carboxyl groups have been hydroxypolyoxyalkylated. In either case the resulting copolymers are potentially reactive (a) by reason of the presence of terminal (i.e. primary or secondary) hydroxyl groups in the hydroxyalkyl ether groups or (b) by reason of the presence of both said hydroxyl groups and unesterified carboxyl groups. Accordingly the reactive hydroxyalkyl ether groups described above correspond to the formula $$HOR(OR')_nO-$$

wherein R and R' are divalent hydrocarbyl groups of 2–8 carbon atoms and can be the same or different and wherein $n$ is an integer between 1 and 8. Such groups are ester-linked to the finished copolymers of the subject component.

In the foregoing and following description, the term "acrylate" is used, except where otherwise noted, in a generic sense identifying esters of $\alpha,\beta$ unsaturated monocarboxylic acids, i.e. acids of the acrylic acid series as identified hereinabove, e.g. acrylic acid, crotonic acid and/or alkyl substituted acrylic acids such as methacrylic acid. In such substituted acrylic acids, the alkyl groups can contain 1–10 carbon atoms, but for practical use the lower alkyl groups are preferred.

The ester-linked hydroxyalkyl ether groups of our copolymeric intermediates, as formed in the ways set forth above, can give different results insofar as properties of finished coating compositions are concerned. Accordingly, for some coating purposes one method can be preferable to another. In all methods, as indicated, we accomplish the hydroxyalkylation by using alkylene oxide(s) (or substituted alkylene oxides) rather than alkylene glycol(s), and in such use of alkylene oxide(s) any of the known techniques, can be employed to accomplish our stated purposes. We prefer, however, to use benzyldimethylamine or ferric chloride as the catalyst, and where ferric chloride is employed we especially prefer to use the subsequent-iron removal technique described in co-pending application Ser. No. 853,619, filed July 12, 1962, now abandoned. Such technique involves the addition of oxalic acid and/or phosphoric acid to the esterified mass and then neutralization of the resulting mass with aqueous alkali metal base, e.g. sodium hydroxide or sodium carbonate. The ferric iron of the catalyst is thereby converted effectively to a form which is easily separated from the mass. The resulting monomer is thereby secured in an essentially iron-free condition with resultant excellent color.

For our desired polymeric intermediates, the hydroxyalkyl groups are ester-linked to copolymers prepared from copolymerizable monomeric compounds preferably those having a $CH_2=C<$ group, such as styrene, vinyl toluene, 1–8 carbon alkyl esters of one or more acrylic acids, acrylonitrile, etc. as above. The following proportions apply to the finished copolymers:

|  | Weight Percent Limits | |
| --- | --- | --- |
|  | Widest | Preferred |
| Hydroxyalkyl ester monomer residues | 5–50 | 5–20 |
| Residues of $CH_2=C\begin{smallmatrix}/\\\backslash\end{smallmatrix}$ monomer(s) (other than alkyl acrylates). | 0–95 } 50–95 | 35–60 |
| Residues of 1–8 carbon alkyl acrylate(s) | 0–95 | 60–20 |
| Unesterified carboxylic acid residue(s) | 0–5 | 2–4 |

The copolymerization of the selected monomers is carried out in the solvent type reflux treatments well understood in the art, using any of a variety of carbon-carbon polymerization catalysts, particularly peroxides. The solvent(s) used are non-reactive and include aromatics such as xylene, toluene, glycol ethers prepared from 2–8 carbon alkylene or oxyalkylene glycols and 1–4 carbon alkanols, 1–4 carbon aliphatic acid esters of said glycol ethers, ketones, alkanols, 1–4 carbon alkyl esters of lower aliphatic monocarboxylic acids, etc.

The catalyst induced polymerization reactions are highly exothermic. We have accordingly found it desirable to start by introducing a heel of solvent(s) or a heel of the uncatalyzed mixed monomers, and then heat the heel to reflux (in the case of a solvent heel) or to about 160°–325° F. The residue of mixed monomers is combined outside of the reaction vessel with the reaction catalyst(s) and then is added slowly to the heated heel in the vessel. The heating of the vessel can then be discontinued since the heat of reaction will thereafter maintain reaction conditions. The reaction vessel is desirably equipped with effective cooling means so that excessive temperatures can be avoided. Usually, however, one can find an appropriate rate of addition of the mixed and catalyzed monomers which (depending on the catalyst employed) will generate all the heat which is needed without requiring external cooling of the vessel. Shortly after all of the mixed and catalyzed monomers have been added to the vessel, the reactions will have been completed.

The initial choice of operating with a heel of solvent or with a heel of uncatalyzed monomers depends on whether or not one wants the finished reaction mass to be free of solvent. Where as here, one wants to use the finished mass as a component of coating compositions then it is usually preferable to start with a heel of solvent(s), the latter being selected so that the finished reaction mass will have the desired solids content and will contain only solvents which are useful in the intended finished coating composition.

It will accordingly be understood that the polymerization of the catalyzed monomers can yield a product of 100 percent solids on one hand (by starting with a heel of uncatalyzed mixed monomers), or on the other hand can yield a solution having any desired solids content such as from about 40 percent to 100 percent preferably 50–90 percent.

The following examples illustrate the principles employed in preparing hydroxyalkyl ether esters and resulting copolymeric components and include the best modes presently known to us for practicing those principles.

In said examples, the preparation of monomeric hydroxymonoalkyl esters is illustrated by Examples A–C, J and K, while Examples D–H and R illustrate conversion of such esters to our desired copolymeric intermediates having hydroxyalkyl and carboxylic functionality. Example L illustrates the hydroxypropylation of preformed hydroxymonoalkyl esters to convert the latter to hydroxylalkyl ether esters, while Example Q illustrates conversion of such ether esters to our desired polymeric intermediates. Examples M, N and P illustrate hydroxypropylation of preformed carboxyl-containing copolymers thereby to secure our desired intermediates. No Examples I, O, V or X are included thereby to avoid confusion.

EXAMPLE A

β-Hydroxypropyl methacrylate is prepared from the following materials:

|   | G. |
|---|---|
| Methacrylate acid [1] | 3475 |
| Hydrated ferric chloride | 23.4 |
| Propylene oxide | 2348 |
| Hydroquinone | 3 |

[1] Contains .025 hydroquinone monomethyl ether.

Charge the methacrylic acid and ferric chloride, establish and maintain an inert nitrogen atmosphere, heat the charge to about 150° F. and start streaming in propylene oxide so as to add all of it within about a two-hour period. Maintain heat at reflux (about 140–150 F.) throughout the addition, cooling the mass when necessary. After all the propylene oxide has been added, discontinue heating and allow exothermicity to carry the temperature to about 200° F. Add the hydroquinone at 200 F., and then continue to maintain the heat at about 200 F. for an additional two hours or until the propylene oxide has been substantially consumed, as determined by acid value which should be about 30–40 (mg. KOH per gram of sample).

At this point the mass is cooled to about 120 F. and is treated to remove the ferric chloride catalyst by either of the following exemplary procedures.

Treatment 1 (phosphoric acid)

Add 29.8 of 85 percent phosphoric acid, with stirring.

Then add an aqueous solution composed of 24.5 g. sodium hydroxide and 195 g. water. Stir.

Then add 997 g. xylol, stir.

Then filter the product and reduce with 2990 g. n-butanol.

The finished monomer solution has a product content of 58 percent and is composed of the following materials:

|   | Percent by wt. |
|---|---|
| β-Hydroxypropyl methacrylate | 55.2 |
| Methacrylic acid | 2.9 |
| Water | 2.0 |
| Xylol | 10 |
| n-Butanol | 29.9 |

Treatment 2 (oxalic acid)

Add 497 g. of an aqueous solution composed of about 50 g. oxalic acid and 447 g. water. Stir well.

Add 52.5 g. of an aqueous solution composed of 10.5 g. sodium hydroxide and 42.0 g. water. Stir well.

Then add 3900 g. xylol, 585 g. water, 117 g. sodium chloride. (The sodium chloride is added to assist phase separation and to reduce mutual phase solubility.) Stir well and allow the aquous phase to settle. Drain off the aqueous layer and filter the non-aqueous product. The product content of the resulting solution is about 60 percent, (57 percent β-hydroxypropyl methacrylate, 3 percent methacrylic acid) and contains about 4 percent water, balance xylol.

The hydroxypropyl esters (and solutions) recovered from either method of purification have excellent water-white color and esters contain about 12.1 percent (wt.) of hydroxyls; (theory=11.2 percent). They exhibit good storage stability.

Treatments 1 and 2 supra are described and claimed in co-pending United States application Ser. No. 169,929 filed Jan. 30, 1962, now abandoned, whose disclosure is here incorporated by reference.

EXAMPLE B

β-Hydroxypropyl acrylate is prepared from the following materials:

|   | G. |
|---|---|
| A. Acrylic acid [1] | 2790 |
| B. Hydrated ferric chloride | 22.4 |
| C. Propylene oxide | 2246 |
| D. Hydroquinone | 2.6 |
| E. Phosphoric acid | 28.7 |
| F. Sodium hydroxide } Solution | 23.2 |
| G. Water | 92.8 |
| H. Xylol | 839 |
| I. n-Butyl alcohol | 2517 |

[1] Contains 0.1 percent hydroquinone monomethyl ether.

Materials A, B, C and D are treated in the manner described in Example A. Then materials E–H inclusive are added as in Treatment 1 above, followed by filtration of the product. The filtered product is reduced with I. The resulting hydroxypropyl acrylate has a hydroxyl content of about 13.4 percent by weight; (theory=12.6 percent).

EXAMPLE C

Di (β-hydroxypropyl) itaconate is prepared from the following materials:

|   | G. |
|---|---|
| Itaconic acid | 765 |
| Tetrahydrofuran [1] (as solvent) | 965 |
| Hydrated ferric chloride | 6.8 |
| Propylene oxide | 682 |
| Phosphoric acid (85 percent) | 8.7 |
| Methanol solution of NaOH (at 10 percent NaOH by wt.) | 70.0 |
| n-Butyl alcohol to 50 percent solids (wt.) | |

[1] Contains 0.1 percent hydroquinone.

The ferric chloride is dissolved in the tetrahydrofuran and charged to a flask. The itaconic acid is added and a nitrogen atmosphere is established and thereafter maintained. The charge is heated to about 130° F. at which point addition of propylene oxide is begun, with heat off, at a rate designed to add all of it within about 2 hours. As the oxide is added the temperature rises to 145–160° F. After all of the oxide is in, heating is resumed and a temperature of 165–175° F. is maintained for about three hours. At this point about 100 percent conversion of the propylene oxide has been attained, (acid value about 28), and the heat is cut off. Add the phosphoric acid, then the methanol/NaOH solution, stir, and then distill off most to all of the tetrahydrofuran by attaining a final flask temperature of about 300° F. Allow the mass to settle, reduce same with the n-butyl alcohol and filter.

It should be noted that in Examples A–C and E (below), the n-butyl alcohol used to reduce the hydroxypropyl esters also has the function of suppressing transesterification to the diesters, whose presence leads to high viscosities and/or gelled products. Isopropyl alcohol can be used similarly.

EXAMPLE D

A copolymer is prepared from the hydroxypropyl methacrylate of Example A, Treatment 1 or 2, by using the following materials and proportions:

| | Lbs. | Solids, percent |
|---|---|---|
| Ingredient A: | | |
| Hydroxypropyl methacrylate solution (Ex. A) | 227.5 | 21.5–22.0 |
| Methacrylic acid | 10.7 | 2.98 total |
| 2-ethylhexyl acrylate | 205.5 | 35.2–35.0 |
| Styrene | 235.0 | 40.3–40.0 |
| Benzoyl peroxide | 6.0 | |
| Tert. butyl perbenzoate | 6.0 | |
| Ingredient B: | | |
| n-Butyl alcohol | 132.5 | |
| Xylol | 177.5 | |

B is charged to a kettle equipped with a condenser and heated to about 238° F. The mixture A is then streamed in at a rate calculated to add all in about 2 hours. Refluxing occurs while A is being added, and is thereafter maintained (temperature held at about 235–240° F.). After all of mixture A has been added, the viscosity is about S (Gardner-Holdt at 77° F.). Refluxing is continued for about another 3.5 hours during which time the viscosity is raised to $Z-Z_1$. The heat is then cut off and the batch allowed to cool. The resulting copolymer has a solids content of about 60%, an acid value of about 20 (calculated on solids), a Gardner color less than 1, and a hydroxyl content of about 2.5% (wt.).

The hydroxypropyl acrylate of Example B can be substituted in the above example for the methacrylate, to secure a fully comparable copolymer.

EXAMPLE E

A copolymeric intermediate using the di(hydroxypropyl) itaconate of Example C is prepared from the following kinds and amounts of materials:

| | Lbs. | Solids, percent |
|---|---|---|
| Ingredient A: | | |
| Di (hydroxypropyl) itaconate solution (Ex. C) | 300 | 16.66 |
| 2-ethylhexylacrylate | 300 | 33.33 |
| Styrene | 400 | 44.44 |
| Methacrylic acid | 50 | 5.55 |
| Benzoyl peroxide | 10 | |
| Tert. butyl perbenzoate | 10 | |
| Ingredient B: | | |
| n-Butyl alcohol | 190 | |
| Xylol | 340 | |

Mixture B is charged to a kettle equipped with a condenser and is heated therein to about 200° F. Mixture A is then streamed in with heat off, at a rate calculated to add all in about 1.25 hours. At the end of this time exothermicity has raised the temperature to about 250° F., and refluxing has continued for some time. The temperature is thereafter maintained at about 245° F. for about 3.5 hours at the end of which time the viscosity (Gardner-Holdt) of the mass is about X. Six additional grams of benzoyl peroxide is added at this time and heating is continued at 240–245° F. for about 2.25 hours, thereby attaining a solids content of about 58% and a viscosity of X–Y. The batch is thereupon allowed to cool. Its acid number is about 34 (calculated on solids) and has a Gardner color of 1–2.

EXAMPLE F

The hydroxypropyl methacrylate of Example A (Treatment 1 or 2) is here converted to a polymeric intermediate by employing the following kinds and amounts of materials:

| | Lbs. | Solids, percent |
|---|---|---|
| Ingredient: | | |
| Hydroxypropyl methacrylate solution (Ex. A) | 333 | 19.0 |
| Methacrylic acid | 46 | 5.6 (total) |
| Styrene | 300 | 30.0 |
| Ethyl acrylate | 454 | 45.4 |
| Benzoyl peroxide | 10 | |
| Tert. butyl perbenzoate | 10 | |
| Ingredient B: | | |
| n-Butylalcohol | 207 | |
| Xylol | 340 | |

Mixture B is charged and heated to 210° F. Mixture A is added at a rate calculated to add all in about one hour. During addition and subsequently, the heating is controlled to maintain the charged mass at about 240° F. About one hour after all of mixture A has been added, the Gardner-Holdt viscosity is about X–Y and refluxing is occurring. After about another 1.25 hours the viscosity is only $Z_1-Z_2$ so 5 g. benzoyl peroxide is added and heating is continued for another half hour. The batch is then cooled. Final Gardner-Holdt viscosity at 77° F. is $Z_3-Z_4$, the solids content is about 60 percent, the acid value is about 50 and the Gardner color is less than 1.

EXAMPLE G

The hydroxypropyl methacrylate ester product of Example A (Treatment 2) is here copolymerized with various kinds and amounts of copolymerizable monomers to produce desired copolymer intermediates of the invention. The following table indicates the various formulations, in parts by weight.

| Material | Run and Solids | | | | |
|---|---|---|---|---|---|
| | 1 | 2 | 3 | 4 | 5 |
| Ex. A monomer, (Treatment 2) contained in 387 g. sol'n. | 232 | 232 | 232 | 232 | 232 |
| Methacrylic acid (glacial) | 18 | 18 | 18 | 18 | 18 |
| Styrene | 250 | 300 | 250 | 350 | 370 |
| 2-ethyl hexyl acrylate | | 300 | | | 350 |
| Butyl acrylate | 350 | | | 200 | |
| Methyl methacrylate | 150 | 150 | 150 | | |
| Ethyl acrylate | | | 350 | 200 | |
| N,N-diethylamine-ethyl acrylate | | | | | 30 |
| Total solids | 1,000 | 1,000 | 1,000 | 1,000 | 1,000 |
| Benzoyl peroxide | 10 | 10 | 10 | 10 | 10 |
| Tert. butyl perbenzoate | 10 | 10 | 10 | 10 | 10 |
| n-Butyl alcohol | 340 | 340 | 340 | 340 | 340 |
| Xylol | 200 | 200 | 200 | 200 | 20 |
| Final solids content, percent | 60.8 | 60 | 59.5 | 60 | 58.4 |
| Gardner Holdt Viscosity | $Z_3$ | $Z_1-Z_2$ | $Z_4$ | $Z-Z_1$ | $Z_5$ |
| Calculated acid value [1] | 20 | 20 | 20 | 20 | 20 |
| Gardner color [2] | WW[2] | WW | WW | 1 | 7–8 |

[1] On solids.
[2] Water White.

The "runs" tabulated above were carried out in full accord with the procedure described in Example D by merely substituting the here indicated kinds and amounts of materials.

EXAMPLE H

Polymeric intermediates illustrating variations in monomer contents are summarized by the following tabulations, where weights of materials employed are expressed in grams. The intermediates are prepared in full accord with the procedure of Example D using the same catalysts and solvents in proportionate amounts.

| Monomer | 1 | 2 | 3 | 4 | 5 | 6 | 7 | 8 | 9 | 10 |
|---|---|---|---|---|---|---|---|---|---|---|
| Styrene | 19 | 38.5 | 58 | | | | 45.2 | 41.8 | 38.5 | 38.5 |
| Vinyl toluene | | | | 19 | 38.5 | 58 | | | | |
| 2-et, hex, acrylate | 58 | 38.5 | 19 | 58 | 38.5 | 19 | 45.2 | 41.8 | 38.5 | 38.5 |
| Ex. A (monomer) [1] | 23 | 23 | 23 | 23 | 23 | 23 | 9.6 | 16.4 | 23 | 23 |
| Methacrylic acid | 1.8 | 1.8 | 1.8 | 1.8 | 1.8 | 1.8 | 1.8 | 1.8 | 2.8 | 0.9 |
| Cooking time, hours | 7 | 7 | 11 | 7 | 6 | 7 | 7 | 7 | 7 | 6 |
| G–H viscosity | U–V | X–Y | $Z_3$ | U | X–Y | $Z_2-Z_3$ | V | X | Y | X–Y |
| Solids Content, percent | 61 | 60.5 | 61.4 | 59.0 | 59.8 | 59.3 | 59.5 | 59.5 | 59.6 | 59.2 |

[1] Charged as the solution prepared in Example A, Treatment 1.

The Gardner color of all finished solutions of intermediates is less than 1.

EXAMPLE J

This example illustrates the preparation of hydroxypropyl methacrylate by using benzyldimethylamine as hydroxyalkylation catalyst.

| | G. |
|---|---|
| Methacrylic acid | 594 |
| Hydroquinone | 0.37 |
| p-Benzoquinone | 0.094 |
| Benzyldimethylamine | 4 |
| Propylene oxide | 401 |

The propylene oxide is added slowly to the other ingredients at 200° F. so that a temperature of 200° F. is maintained without too vigorous a reflux. The addition requires about 5 hours. The temperature is maintained at 200° F. until an acid value of 30–40 is reached, requiring an additional 5–6 hours. The product has a Gardner color of 2–4 and a hydroxyl content of 11.8 percent.

The purpose of the p-benzoquinone is to eliminate vapor phase polymerization of the methacrylic acid.

EXAMPLE K

Preparation of hydroxyethyl methacrylate with benzyldimethylamine.

| | G. |
|---|---|
| Methacrylic acid | 1290 |
| Hydroquinone | 0.8 |
| p-Benzoquinone | 0.2 |
| Benzyldimethylamine | 6.6 |
| Ethylene oxide | 660 |

The first 4 ingredients are mixed and heated to 200° F. A slow trickle of air and ethylene oxide gas are passed in through separate tubes The rate of ethylene oxide gassing is maintained at such a rate that very little reflux and no loss through the condenser takes place at 200° F. Gassing is continued till acid value drops to 30–40. A total time of 15 hours is required. The air is necessary in this example to prevent vapor phase polymerization.

The product has a Gardner color of 8 and is free from polymer. It has a hydroxyl content of 13.5 percent.

EXAMPLE L

This example illustrates the preparation of the hydroxypropyl ether ester by etherification of hydroxypropyl ester with propylene oxide. The latter ester is here secured by the procedure described in Example A (freed of iron by Treatment 2) or by the procedure of Examples J and K.

The ether ester is prepared from the following materials:

| | G. |
|---|---|
| A. Example A, Treatment 2 [1] | 3120 |
| B. BF₃-ether complex } Solution | { 28.8 |
| Xylol | 300 |
| C. Propylene oxide | 2895 |
| D. Xylol | 1650 |

[1] Charge as a water-free solution in xylol, 60 percent solids content. This product was prepared by heating the solution secured by the process of Example A (Treatment 2) to 170° F. under vacuum (thereby to remove water) and replacing the water so removed with xylol.

Charge A and D to a flask. Establish and maintain thereafter a nitrogen atmosphere. Heat to 50° F. and begin simultaneous separate additions of B and C in a ratio of about 1:10. Maintain temperature, by heating and/or cooling, at 80–100° F. After about 6.5 hours all B and C have been added. Cool the mass, add 121.5 g. of a 20 percent solution of sodium hydroxide in methanol, then add 1000 g. water, followed by 100 g. sodium chloride. Separate the aqueous phase, filter, and add .02 percent (wt.) of hydroquinone (as inhibitor), calculated on finished product in the solution.

The finished solution from which the BF₃ catalyst has been largely removed, has an acid value (in the product) of about 10, has a solids (product) content of about 60 percent by wt., contains about 3 percent water and has a hydroxyl content of 5.18 percent by wt. It will be noted that in this example four mols of propylene oxide are added per mol of hydroxypropyl methacrylate. The conditions described in the example are appropriate, by varying the weight of propylene oxide, to add from 1 to 8 mols, preferably 2–6 mols.

In the last step of the example, the solution need not be cooled before adding the 20 percent methanol solution of sodium hydroxide, and after the latter has been added the whole mass can be heated to 150° F. followed by the specified addition of water, salt, etc. In either this or the procedure of the example, the reaction involved is a neutralization of BF₃ with about a stoichiometric quantity of NaOH:

$$BF_3 + 3NaOH \rightarrow 3NaF + B(OH)_3$$

The addition of water dissolves the NaF, and the salt assists phase separation and filtration.

When the product solution of Example J is used as replacement for the solution of Example A in the above example, the BF₃-ether complex should be increased about 20 percent by wt. to overcome the amine present in the Example J solution. This applies equally well when ethylene oxide is used instead of propylene oxide.

EXAMPLE M

This example illustrates the preparation of an acidic copolymer which is subsequently hydroxypropylated to form a desired hydroxypropyl ester combined in copolymeric form.

The starting copolymer is prepared from the following materials in the manner described in Example D.

| | g. | Resin Solids, Percent by wt. |
|---|---|---|
| (1) Glacial methacrylic acid | 7.02 | 15.5 |
| (2) 2-ethyl hexyl acrylate | 9.79 | 21.6 |
| (3) Vinyl toluene | 28.38 | 62.9 |
| (4) Benzoyl peroxide | 0.45 | |
| (5) Tert. butyl perbenzoate | 0.45 | |
| (6) n-Butyl alcohol | 10.00 | |
| (7) Amsco Solvent No. 40L [1] | 40.00 | |
| (8) Benzyldimethylamine | 0.186 | |
| (9) Propylene oxide | 3.75 | |

[1] A mineral spirits solvent at Kauri Butanol Value 37–38; initial boiling point 360–366° F.; ASTM end point 403–410° F.

The acidic copolymer, as prepared from the first seven materials, has a solids content of 48 percent (wt.), an acid number of 99 (on solids), a viscosity of Y–Z (Gardner-Holdt) and a Gardner color of 1. While the solution is still in the flask, the benzyldimethylamine is added (above quantity represents 5 percent by wt. calculated on propylene oxide to be added) and the solution is heated to 260°–270° F. under a nitrogen atmosphere. The propylene oxide is then added incrementally at a rate which affords easy maintenance of the indicated temperature. After about 11 hours the propylene oxide has all been added, and the acid number of the mass has been reduced to about 22 (on solids). The resulting solution is then cooled and is found to have a Gardner-Holdt viscosity of Y–Z, a Gardner color of 1 and a solids content of about 50 percent. The benzyldimethylamine can be replaced with 5 percent of α-methylbenzyl dimethylamine, in which case a reaction time of about 20 hours brings the acid value down to about 8. Slower catalysts are triethylamine (3 percent requires a reaction time of 42 hours to secure an acid number of 24) and the tertiary amine catalyst made by reacting one mol diethylaminopropylamine with two mols butyl glycidyl ether (3 percent of the latter catalyst requires a reaction time of 42 hours to reach an acid value of 35).

EXAMPLE N

ETHYLENE OXIDE ADDITION TO CARBOXYL-BEARING ACRYLIC POLYMERS

| | g. | Resin Solids, Percent by wt. |
|---|---|---|
| (1) Methacrylic acid | 161 | 17.6 |
| (2) 2-ethyl hexyl acrylate | 350 | 38.4 |
| (3) Styrene | 400 | 44.0 |
| (4) Benzoyl peroxide | 9 | |
| (5) Tertiary butyl perbenzoate | 9 | |
| (6) n-Butyl alcohol | 309 | |
| (7) Xylene | 309 | |
| (8) n-Butyl alcohol | 34.0 | |
| (9) Xylene | 34.0 | |
| (10) Benzyldimethylamine | 3.4 | |
| (11) Ethylene oxide | 1 67.5 | |

[1] Theoretical for AV 20).

Ingredients 1–7 are processed as in Example D to a final viscosity of $Z_4$–$G_5$.

Ingredients 8, 9 and 10 are added.

Ingredient 11 is passed in as a gas below liquid surface at a temperature of 230–240° F. until an acid value of 20 is reached (a total time of 8 hours for the oxide addition is required).

Final properties

| | |
|---|---|
| Non-volatile content _____ percent by wt | 60 |
| Viscosity (Gardner-Holdt) | $Z_2$–$Z_3$ |
| Acid Value (on solids) | 21 |
| Color (Gardner) | 1 |

EXAMPLE P

Hydroxyethylated methacrylic acid copolymer

| | G. |
|---|---|
| 1. Styrene | 60.0 |
| 2. Butyl acrylate | 25.0 |
| 3. Methacrylic acid | 10.0 |
| 4. Benzoyl peroxide | 1.0 |
| 5. Tertiary butyl perbenzoate | 1.0 |
| 6. n-Butyl alcohol | 50.0 |
| 7. Xylene | 50.0 |
| 8. Benzyldimethylamine | 0.25 |
| 9. Ethylene oxide | 5.0 |

The first seven materials are converted to a copolymer solution in the manner described in Example D and then the solution is treated as in Example N.

Viscosity of initial polymer solution is R (Gardner-Holdt).

Final properties

| | |
|---|---|
| Non-volatile content _____ percent by wt | 49.5 |
| Viscosity (Gardner-Holdt) | U |
| Acid value (on solids) | 14.5 |
| Color (Gardner) | 3. |

EXAMPLE Q

This example illustrates the conversion of the monomeric hydroxypropyl ether ester of Example L, and of comparable ether esters, to finished copolymers appropriate for use in making our improved coating compositions. In the following table, monomers containing 2, 4 and 6 mols of added propylene oxide are referred to as starting materials. The hydroxypropyl ether monomer containing 4 mols of added propylene oxide (Run 2) is the monomer whose preparation is described in Example L. The monomers containing 2 and 6 mols of added propylene oxide (added to hydroxypropyl ester) were prepared in accordance with Example L except for adjustment of the amount of propylene oxide added to the hydroxyalkyl methacrylates of Examples A, J and K, and except for indicated adjustment of amount of $BF_3$ catalyst.

| Materials | Run Number | | |
|---|---|---|---|
| | 1 | 2 | 3 |
| Propylene oxide (mols) | 2 | 4 | 6 |
| Amount $BF_3$ catalyst, percent | 1 | 1 | 1 |
| $BF_3$ removed | Yes | Yes | Yes |
| Acid value of product | 13.5 | 10 | 8 |
| Percent hydroxyl (calc.) | 6.5 | 4.5 | 3.45 |

| | Composition of Monomer Solution (Wt. percent) | | |
|---|---|---|---|
| Polyether monomer, percent | 58.3 | 58.3 | 58.3 |
| Xylol, percent | 38.8 | 38.8 | 38.8 |
| Water, percent | 2.9 | 2.9 | 2.9 |

| | Conversion to Polymers (Method of Ex. D.) | | |
|---|---|---|---|
| Solution, Run No. 1, g | 430 | | |
| Solution, Run No. 2, g | | 500 | |
| Solution, Run No. 3, g | | | 688 |
| Glacial methacrylic acid, g | 25 | 25 | 24 |
| Styrene, g | 500 | 675 | 576 |
| Butyl acrylate, g | 225 | | |
| Benzoyl peroxide, g | 10 | 10 | 10 |
| t-Butyl perbenzoate, g | 10 | 10 | 10 |
| Xylol, g | 853 | 820 | 753 |
| Non-volatile content (wt. percent) | 49 | 50 | 49 |
| Color | WW [1] | WW [1] | WW [1] |
| Viscosity, Gardner-Holdt | P | T–V | N–O |
| Acid Value, on non-vol | 18–22 | 18–22 | 18–22 |
| Hydroxyl content (calc; wt. percent) | 1.62 | 1.35 | 1.38 |

[1] Water White.

EXAMPLE R

A polymeric hydroxyalkyl-containing product is here prepared from the following materials:

| | G. |
|---|---|
| Monomeric itaconic diester of Example C | 23.50 |
| 2-ethylhexyl acrylate [1] | 23.50 |
| Styrene | 23.50 |
| Xylol | 20.00 |
| n-Butyl alcohol | 8.30 |
| Benzoyl peroxide | 0.60 |
| t-Butyl perbenzoate | 0.60 |

[1] Contains about 0.01 percent methyl ether of hydroquinone.

The above materials are polymerized together in the manner described in Example D to form a solution having a non-volatile content of 60 percent (wt.), a Gardner-Holdt viscosity of W–X, an acid number (on non-volatiles) of 6–7 and a Gardner color slightly under 1.

EXAMPLE S

This illustrates the preparation of a low acid value copolymer product including hydroxypropyl methacrylate. The copolymer is prepared in the manner of Example D from the following materials:

| | G. |
|---|---|
| Example A, Treatment 2, solution | 19.60 |
| 2-ethylhexyl acrylate | 11.75 |
| Vinyl toluene | 23.55 |
| VM&P Naphtha | 32.20 |
| Benzoyl peroxide | 0.60 |
| t-Butyl perbenzoate | 0.60 |

The resulting solution of copolymer has a product content of 60 percent by wt., a Gardner-Holdt viscosity of Z, an acid number (on non-volatiles) of 6–7, and a Gardner color of 1. The resin is easily soluble in mineral spirits and exhibits good flexibility in combination with a mineral-spirits-soluble alkylated melamine/formaldehyde (4:1 solids ratio).

EXAMPLE T

Hydroxypolyoxypropylene component for use in the invention is prepared from the following materials:

| | G. |
|---|---|
| Hydroxypropyl ether ester solution of Example L supra | 200.0 |
| Styrene | 229.6 |
| Methacrylic acid | 10.4 |
| Butyl acrylate | 40.0 |
| Benzoyl peroxide | 4.0 |
| t-Butyl perbenzoate | 4.0 |
| Xylol | 319.9 |

The foregoing materials are treated in the manner described in Example D supra to secure a finished solution of resinous copolymer having a non-volatile content of 50±1 percent, a Gardner-Holdt viscosity of Q–S (78° F.), an acid value of 11–14 on non-volatile matter, and a weight of 8.04±.01 lbs. per gallon. The finished solution of resinous copolymer has a non-volatile content of 59–61 percent, an acid number of 11–14 (based on non-volatiles), a Gardner-Holdt viscosity of $Z-Z_3$ (77° F.) and weighs about 8.19±.01 lbs. per gallon.

EXAMPLE U

Mixed hydroxypropyl ether ester/hydroxypropyl ester components are prepared in accordance with the method of Example D supra from the following materials:

| | a | b | c |
|---|---|---|---|
| Hydroxypropyl ether ester solution of Example L, supra, g | 333 | 333 | 640 |
| Hydroxypropyl ester solution of Example A, Treatment 2, supra, g | 638 | 738 | 805 |
| Isobutyl acrylate, g | None | 886 | 794 |
| Butyl acrylate, g | 443 | None | None |
| Ethyl acrylate, g | 443 | None | None |
| Methacrylic acid, g | 41 | 41 | 41 |
| Styrene, g | 775 | 775 | 691 |
| t-Butyl perbenzoate, g | 23 | 23 | 23 |
| Benzoyl peroxide, g | 23 | 23 | 23 |
| Xylol, g | 399 | 386 | 266 |
| Butanol, g | 762 | 749 | 754 |

The finished solutions of resinous copolymer have non-volatile contents of 59.9 percent, 59.4 percent and 57.4 percent, respectively; acid numbers of 12.6, 12.0 and 11.5, respectively (based on solution per se); Gardner-Holdt viscosities of $Z-Z_1$, Z and X–Y (78° F.) respectively, and weigh about 8.20, 8.12 and 8.11 lbs. per gallon, respectively.

The coating compositions

As pointed out above, the coating compositions of the invention comprise a blend of the two kinds of components described hereinabove. To blend the said components together (with or without other components identified hereinafter) any inert, volatile organic solvents or mixtures of solvents can be used, so long as the ultimate coating vehicle so secured is a homogeneous single-phase solution.

The relative proportions between the alkylol acrylamide component and the hydroxypolyoxyalkylene ester component can be varied widely depending on the number of reactive groups in each component, on the length(s) of the ether chain(s) in the hydroxyalkylene ether radicals and on the physical properties and resistance characteristics desired in the final thermoset film. However, we presently prefer to use 15 percent up to 50 percent of the alkylolacrylamide component, based on the total weight of non-volatile matter in the finished clear blends of the invention.

The non-volatile solids contents of the coating vehicles of the invention can vary widely depending on the adopted method of application, on whether or not the coatings are pigmented or clear, on the character of the substrate to be coated, and on other minor factors well known to those skilled in the coating art. However, for most purposes and for most application methods, non-volatile contents between about 20 and 50 percent by weight (measured on the clear vehicle) are satisfactory.

The coating vehicles can be extended, filled and/or pigmented with any of the usual pigments, fillers and extenders when due account is taken of any acid value existing in the coating vehicle. The amounts of such materials added to the vehicles can vary widely, e.g. so as to give flat, semi-gloss or glossy coatings.

The coating vehicles, whether clear or pigmented, can also be modified by including various film-forming materials having reactive groups which assist and/or partake in the thermosetting reactions involved in cross-linking the alkylol acrylamide component and hydroxypolyoxyalkylene ester component. The amine/aldehyde resinous reaction products known as aminoplasts and the phenol/aldehyde resinous reaction products known as phenoplasts are especially useful as modifiers. For this purpose, such resinous reaction products should be so formulated as to be soluble in organic solvent(s); that is, the aminoplasts should preferably be alkylated reaction products, and the phenoplasts should preferably be the aldehyde-modifications of nuclearly-alkylated phenolic compounds. Other modifiers which can be used are alkyd resins and/or vinyl resins, for flexibility, adhesion and/or chemical resistance. Epoxy compounds, that is, compounds having more than about one 1,2 epoxy group per molecule, can be added to improve adhesion, cross-linking and/or chemical resistance. Such added modifiers should be small in amount, e.g. between about 5 percent and 20 percent by weight, based on the total non-volatile matter in the coating vehicles of the invention.

The following Roman-numeral examples illustrate the principles of the invention and include the best modes presently known to us for practicing those principles.

EXAMPLES I–III

Table I identifies the kinds and amounts of components used to prepare five different solvent blends, i.e. coating vehicles, corresponding to the invention or included for comparison purposes.

TABLE I

| | Example | | |
|---|---|---|---|
| | I | II | III |
| Material | Weight of Resinous Solids, in grams | | |
| Solution of Example 5, supra | 35 | 25 | 15 |
| Solution of Example T, supra | 65 | 70 | 75 |
| Solution of Example U, supra | | | |
| Melamine/formaldehyde resin [1] | | 5 | 10 |

[1] As 60 percent solution xylol/n-butanol (1:1); resin is a commercial n-butylated melamine/formaldehyde condensation product (MM–47).

The coating vehicles are prepared by cold blending the indicated solutions. Films are applied on cold rolled steel panels by drawing with a .0015″ applicator. The applied films of Examples I, II and III are baked 20 minutes at 300° F. The resulting coated panels are subjected to the various tests indicated below with the indicated results.

| | Example | | |
|---|---|---|---|
| Test | I | II | III |
| Clarity of film | OK | OK | OK |
| Resis. to Glacial Acetic | DW 1 | DW 1 | [3] OK |
| Discolored by 1 N HCl | V.sl. | Sl. | Sl. |
| Affected by 5% NaOH | No | No | No |
| Impact test 40″ lbs | F | P | P |
| OT Bend [2] | | P | |

[1] Discolored, wrinkled.
[2] Identifies a 180° bend in which the coating is on the outside of the bend and the metallic substrate is bent back tight against itself.
[3] 10 minutes.

Abbreviations

V. Sl.—very slight
OK—satisfactory after
Sl.—slight after
F—failed
P—passed

EXAMPLE IV

A pigmented composition is prepared from the following materials by blending and grinding:

| | Solids, g. |
|---|---|
| Solution of Example U(b) | 70 |
| Solution of Example 5 | 25 |
| Bisphenol/epichlorhydrin resin [1] | 5 |
| Butylated melamine/formaldehyde resin | 5 |
| Titanium dioxide (rutile) | 132 |
| Xylol | 100 |
| Methyl isobutyl ketone | 50 |

[1] Liquid resin, melting point about 9° C., epoxide equivalent of about 192.

Films of the composition are applied to metal panels by "drawdown" applicator to a thickness of .003", solvents are allowed to flash off for 5 minutes, and then the panels are baked 30 minutes at 325° F. The coatings exhibit a semi-gloss sheen and a pencil hardness of H–2H, are lifted in 10 minutes with acetic acid, pass the Wedge bend test (no failure) and successfully resist 5 percent sodium hydroxide solution for 48 hours.

EXAMPLE V

A clear coating composition is prepared by blending the following materials together:

| | Solids, g. |
|---|---|
| Solution of Example 5 | 25.0 |
| Solution of Example U(c) | 55.4 |
| Alkyd resin [1] | 5.0 |

[1] A blend of (A) one part maleic/adipic/diethylene glycol polyester with (B) three parts maleic/phthalic/propylene glycol polyester, with (C) styrene at 30 percent by weight, based on said polyesters of A and B.

The clear blend is applied to metal panels by "drawdown" applicator to a thickness of .0015", flashed five minutes, then baked 30 minutes at 325° F. The resulting film exhibits a pencil hardness of H–2H, does not fail the Wedge bend test, is lifted in 10 minutes with acetic acid, and is removed from the panel in 24 hours of immersion in 5 percent sodium hydroxide.

EXAMPLE VI

A clear coating composition is prepared by blending the following materials together:

| | Solids, g. |
|---|---|
| Solution of Example U(c) | 70 |
| Solution of Example 5 | 25 |
| Butylated melamine/formaldehyde resin | 5 |
| Partially hydrolyzed vinyl chloride/vinyl acetate resin [1] | 5 |
| Methyl ethyl ketone | 20 |

[1] Commercial resin, about 6 percent OH content; dissolved in methyl ethyl ketone at 25 percent solids content.

A drawdown film on metal at .0015" thickness is flashed 5 minutes, then baked 30 minutes at 327° F. The resulting film exhibits excellent mar resistance, a pencil hardness of 4H–5H, no failure in the Wedge bend test, is removed from the panel in 13 minutes in glacial acetic acid, is softened in 20 minutes by methyl ethyl ketone, and turns brownish after 24 hours in 5 percent sodium hydroxide.

EXAMPLE VII

Two clear coating compositions are prepared by blending the following materials together:

| | Solids | |
|---|---|---|
| | a | b |
| Solution of Example U(b), g | 70 | 70 |
| Solution of Example 5, g | 25 | 25 |
| Butylated melamine/formaldehyde, g | 5 | None |
| Phenol/formaldehyde resin, g | 5 | 10 |

The clear compositions are applied to metal panels by a drawdown applicator to film thickness of .0015", then are flashed for 5 minutes, then baked 30 minutes at 325° F. The baked films exhibit the following characteristics.

| | | |
|---|---|---|
| Pencil hardness | 5H–6H | H–2H. |
| Mar resistance | Medium | Excellent. |
| Wedge bend test | Failed, ⅝" | No failure. |
| Glacial acetic acid test | Failed 13 min | Soft in 10 min. no lifting. |
| 5 percent NaOH test | OK after 24 hours | OK after 48 hours. |

EXAMPLE VIII

A clear coating composition is prepared by blending the following materials together:

| | Solids, g. |
|---|---|
| Solution of Example 5 | 25 |
| Solution of Example U(b) | 70 |
| Butylated melamine/formaldehyde resin | 5 |
| Bisphenol/epichlorhydrin of Example VI | 5 |

A drawdown film .0015" thick on an iron panel is flashed for five minutes and then baked 30 minutes at 325° F. The baked film has a pencil hardness of H–2H exhibits no failure in the Wedge bend test, and is satisfactory after 48 hours in 5 percent sodium hydroxide solution.

EXAMPLE IX

Another clear epoxy-modified coating composition is prepared by blending the following materials together:

| | Solids, g. |
|---|---|
| Bisphenol-epichlorhydrin resin of Example VIII | 5 |
| Solution of Example 5 | 25 |
| Solution of Example U(c) | 70 |
| Methyl isobutyl ketone | 11 |
| Methyl ethyl ketone | 20 |

A drawdown film .0015" thick on an iron panel is flashed five minutes and then baked for 30 minutes at 350° F. The resulting film exhibits the following characteristics:

Pencil hardness—H–2H
Wedge bend—No failure
Discolors in glacial acetic acid and lifts in 10 minutes.
Dissolves in 10 minutes in methyl ethyl ketone.
OK after 48 hours in 5 percent sodium hydroxide.

From the foregoing description of the invention it will be recognized that the coatings thereof have special merit in situations where high baking temperatures are practiced and little time is allowed between application of a coating and introduction into a bake oven. Moreover, the coatings provide good versatility in formulating with a minimum number of acrylic copolymers.

What is claimed is:
1. A heat hardenable linear addition copolymer comprising the interpolymerization reaction product of:
 (a) from about 1.2 to about 26 weight percent of acrylamide,
 (b) from about 0.75 to about 1.75 mol, per mol of said acrylamide, of a lower aliphatic aldehyde,
 (c) from about 0 to about 1.75 mol, per mol of said aldehyde, of an alcohol,

(d) from about 0.6 to about 45 weight percent of a carboxylic acid ester of the formula

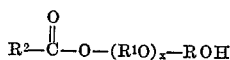

wherein $R^1$ and $R$ can be same or different lower alkylene groups containing from 2 to 8 carbon atoms; where $x$ is an integer of from 1 to 8; and where the grouping

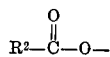

is an acyloxy group selected from the class consisting of acyloxy residues of acrylic, methacrylic and ethacrylic acids and the acyloxy residues of full and half esters of $\alpha,\beta$-unsaturated dicarboxylic acids,
(e) from about 0 to about 5 weight percent of an $\alpha,\beta$-ethylenically unsaturated carboxylic acid, and
(f) from about 25 to about 95 weight percent of at least one monomer having a $CH=C<$ group, the sum of said percentages totaling 100 weight percent.

2. The resin composition as claimed in claim 1 wherein the interpolymerization reaction product comprises
(a) from about 2 to 15 weight percent of acrylamide,
(b) from about 0.9 to about 1.5 mole per mole of said acrylamide of a lower aliphatic aldehyde,
(c) from about 0.9 to about 1.0 mole, per mole of said aldehyde, of a lower alkanol,
(d) from about 2 to about 15 weight percent of a carboxylic acid ester of the formula

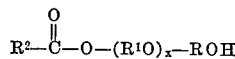

wherein $R^1$ and $R$ are propylene groups, wherein $x$ is an integer of from 2 to 6, and where the grouping

is a residue of methacrylic acid,
(e) from about 1 to about 3 weight percent of acrylic acid,
(f) from about 25 to about 95 weight percent of at least one monomer having a $CH_2=C<$ group, the sum of said percentages totaling 100 weight percent.

3. The resin composition as claimed in claim 2 wherein the acrylamide employed to form the interpolymerization reaction products is between about 2 and about 6 weight percent and the carboxylic acid ester employed is between about 4 to about 8 percent.

4. The resin composition as claimed in claim 2 wherein the acrylamide employed to form the interpolymerization reaction product is between about 8 and about 15 weight percent and the carboxylic acid ester employed is between about 8 to about 20 percent.

5. The resin composition as claimed in claim 2 wherein the lower aliphatic aldehyde is formaldehyde, the lower alcohol is butanol and the $\alpha,\beta$-ethylenically unsaturated carboxylic acid is selected from the group consisting of acrylic and methacrylic acids.

6. The resin composition as claimed in claim 5 wherein the monomer of component (f) consists essentially of at least one monomer selected from the group consisting of lower alkyl acrylates and methacrylates, styrene and methyl-styrene.

7. A coating composition having as its main film-forming vehicle a single phase homogeneous organic solvent solution of the interpolymerization reaction product of claim 1, said composition consisting of from about 20 to about 50 weight percent of said resin and from about 80 to about 50 weight percent of said organic solvent.

8. A coating composition having as its main film-forming vehicle a single phase homogeneous organic solvent solution of the interpolymerization reaction product of claim 2, said composition consisting of from about 80 to about 50 weight percent of said organic solvent.

9. A metal article having at least one surface thereof coated with a baked and thermoset film of the coating composition claimed in claim 7.

10. A metal article having at least one surface thereof coated with a baked and thermoset film of the coating composition claimed in claim 8.

11. Thermosetting coating compositions having as its main film-forming vehicle a single-phase homogeneous solvent solution of two heat hardenable linear additional copolymer-type components (I) and (II) identified below, said component (I) constituting 15–50 percent by weight based on the total weight of the copolymer in said organic solvent solution, and component (II) constituting the balance of 85–50 percent by weight;

said component (I) being characterized by having N-alkylol acrylamide substituents and carboxyl groups as its only functional groups and being a copolymer of polymerizable, ethylenically unsaturated monomers corresponding to the formula

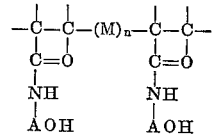

where M represents a unit of monomer polymerizable with acrylamide and is selected from the groups (a) (b) identified below;
wherein $n$ represents a whole number greater than one;
wherein —AOH represents an alkylol group in which A is a group containing hydrogen and 1–5 carbon atoms;
wherein the free valences of said formula are satisfied with groups selected from the class consisting of hydrogen and hydrocarbyl groups;
and wherein the structure shown in said formula, exclusive of —$(M)_n$— consists essentially of residues corresponding to 8–45 percent by weight alkylol acrylamide while —$(M)_n$— represents the remainder of said structure and consists essentially of residues corresponding to:
(a) 1–8 percent by weight based on the total weight of said structure of acid monomers selected from the group consisting of:
(i) acrylic acids corresponding to the formula $$CHR=CR'—COOH$$

wherein R and R' can be the same or different and are selected from the class consisting of hydrogen and alkyl groups of 1–10 carbon atoms;
(ii) maleic and fumaric acids;
(iii) mono-alkyl maleates having alkyl groups of 1–10 carbon atoms, and
(b) 47–91 percent by weight, based on the total weight of said structure, of copolymerizable ethylenically unsaturated monomers having no functionality other than said ethylenic unsaturation, said monomers being selected from the class consisting of:
(i) dialkyl maleates having 1–10 carbon atoms in each alkyl group, and
(ii) monomers having a $CH_2=C<$ group;
said component (I) being further characterized by being free of ethylenic unsaturation whereby it exhibits the characteristics of a thermoplastic resin;
said component (II) being a thermoplastic copolymer free of ethylenic unsaturation and characterized by:
(a) being a copolymer of polymerizable ethylenically unsaturated monomers,
(b) having hydroxyl functionality in its structure due to the presence of hydroxypolyoxyalkylene ester linkages therein,
(c) optionally having carboxyl functionality in its structure due to the optical presence of unesterified carboxyl groups therein, and (d) consisting essentially of residues corresponding to:
(i) 5–50 percent by weight based on the total weight of said copolymer of at least one carboxylic acid ester corresponding to the formula

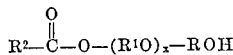

wherein $R^1$ and R are the same or different lower alkylene groups containing from 2 to 8 carbon atoms, where $x$ is a whole number of from 1 to 8, where

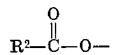

is an organic acid radical selected from the group consisting of the acyloxy residues of acrylic acids defined in (I) (a) (i) above and the monoacyloxy residues of half esters of α,β-unsaturated dicarboxylic acids;
(ii) 0–5 percent by weight based on the total weight of said copolymer of unesterified α,β-unsaturated carboxylic acids selected from the class consisting of monocarboxylic acids and dicarboxylic acids, and
(iii) as the remainder monomers having a $CH_2=C<$ group having no functionality other than the ethylenic unsaturation of said $CH_2=C<$ group.

12. A coating composition as claimed in claim 11 wherein at least a part of the —AOH substituents of component (I) have been etherified with lower alkanols and thereby have been converted at least partially to —AO— alkyl substituents.

13. A coating composition as claimed in claim 12 wherein the acid residues of part (ii) of component (II) consist essentially of residues of α,β-unsaturated monocarboxylic acids.

14. A coating composition as claimed in claim 13 wherein said component (II) is the hydroxyalkylation product of a precursor copolymer composed essentially of residues of:
(a) 5–50 weight percent, based on the total weight of said precursor polymer, of monomeric hydroxyalkyl esters of α,β-unsaturated carboxylic acids having up to two carboxyl groups, and
(b) 95–50 percent by weight of copolymerizable monomers selected from the class consisting of:
(i) 0 to 95 percent by weight of monomers having a $CH_2=C<$ group, other than the monomers in (ii) next below,
(ii) 0 to 95 percent by weight of 1–8 carbon alkyl esters of acrylic acids selected from the group consisting of acrylic acids corresponding to the formula

CHR=CR'—COOH wherein R and R' can be the same or different and are selected from the class consisting of hydrogen and alkyl groups of 1–10 carbon atoms, and (iii) 0 to 5 percent by weight of unesterified α,β-unsaturated carboxylic acid having up to two carboxyl groups per molecule.

15. A coating composition as claimed in claim 14 wherein said acid residues of hydroxylalkyl esters of α,β-unsaturated carboxylic acids amount to 5–20 percent by weight; wherein said monomers having a $CH_2=C<$ group amount to 35–60 percent by weight; wherein said alkylacrylates amount to 60–20 percent by weight; and wherein said unesterified carboxylic acid amounts to 2–4 percent by weight.

16. A coating composition as claimed in claim 15 wherein said unesterified carboxylic acid is a monocarboxylic acid.

17. A coating composition as claimed in claim 16 wherein said component (I) has —AOH— groups which consist essentially of methylol groups; wherein said component (I) amounts to 15–35 percent by weight, based on the total weight of copolymer in said vehicle and wherein said component (II) amounts to the remainder of about 65–85 percent by weight.

18. A coating composition as claimed in claim 17 to the said vehicle of which has been added about 5–20 percent by weight, based on the total weight of non-voltatile matter in said vehicle at least one modifier selected from the group consisting of alkyd resins, vinyl resins, aminoplasts phenoplasts and epoxy compounds having more than one epoxy group per molecule, said modified vehicle being a homogeneous single-phase, organic solvent solution having a non-volatile content of between about 20 percent and about 50 percent by weight.

19. A coating composition as claimed in claim 11 to the said vehicle of which has been added about 5–20 percent by weight, based on the total weight of non-volatile matter in the vehicle, of at least one modifier selected from the group consisting of alkyd resins, vinyl resins, aminoplasts, phenoplasts, and epoxy compounds having more than one 1,2 epoxy group per molecule, said modified vehicle being a homogeneous single-phase, organic solvent solution having a non-volatile content of between about 20 percent and about 50 percent by weight.

20. A metal article having a surface thereof coated with a baked and thermoset film of the coating composition claimed in claim 11.

21. A metal article having a surface thereof coated with a baked and thermoset film of the coating composition claimed in claim 18.

22. A metal article having a surface thereof coated with a baked and thermoset film of the coating composition claimed in claim 19.

References Cited

UNITED STATES PATENTS 3,230,275   1/1966   Sekmaitas _____ 260—873
3,278,469  10/1966   Pascale _____ 260—21

JOSEPH L. SCHOFER, Primary Examiner.

STANFORD M. LEVIN, Assistant Examiner.

U.S. Cl. X.R.

117—132; 260—312, 314, 332, 336, 328, 334, 41, 72, 78.5, 80.8, 80.73, 80.75, 484, 836, 837, 838, 844, 849, 851, 873, 901